(12) United States Patent
Ogilvie

(10) Patent No.: US 7,555,021 B2
(45) Date of Patent: Jun. 30, 2009

(54) DIGITAL MULTI-SOURCE MULTI-DESTINATION VIDEO MULTIPLEXER AND CROSSBAR DEVICE

(75) Inventor: Bryan J. Ogilvie, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 846 days.

(21) Appl. No.: 11/251,000

(22) Filed: Oct. 5, 2005

(65) Prior Publication Data

US 2007/0076123 A1    Apr. 5, 2007

(51) Int. Cl.
| | |
|---|---|
| G06F 15/00 | (2006.01) |
| H04J 3/02 | (2006.01) |
| H04N 7/12 | (2006.01) |
| G06K 9/36 | (2006.01) |
| G06K 9/54 | (2006.01) |
| H04N 11/08 | (2006.01) |
| H04N 11/18 | (2006.01) |
| H04N 11/12 | (2006.01) |
| H04N 7/04 | (2006.01) |
| H04N 5/04 | (2006.01) |

(52) U.S. Cl. .............. 370/537; 375/240; 382/287; 382/303; 706/44; 706/920; 348/490; 348/491; 348/492; 348/495; 348/500

(58) Field of Classification Search .............. None
See application file for complete search history.

(56) References Cited

U.S. PATENT DOCUMENTS

| | | | | |
|---|---|---|---|---|
| 5,629,736 | A  * | 5/1997 | Haskell et al. | 348/386.1 |
| 7,227,510 | B2 * | 6/2007 | Mayer et al. | 345/1.1 |
| 2005/0132408 | A1 * | 6/2005 | Dahley et al. | 725/80 |
| 2006/0146205 | A1 * | 7/2006 | Tang | 348/808 |
| 2009/0073320 | A1 * | 3/2009 | Todo et al. | 348/705 |

* cited by examiner

*Primary Examiner*—Wing F Chan
*Assistant Examiner*—Hicham B Foud
(74) *Attorney, Agent, or Firm*—David S. Kalmbaugh

(57) ABSTRACT

A Digital Multi-Source Multi-Destination Video Multiplexer and Crossbar Device and method which may be applied to a video imaging system, in which multiple input image sources including super-computer-generated digital image scenes, personal computer generated digital image scenes, or any machine with OC-48 fiber optically generated digital scenes are multiplexed, bit combined, and output as a selection of multiple digital video output formats.

18 Claims, 20 Drawing Sheets

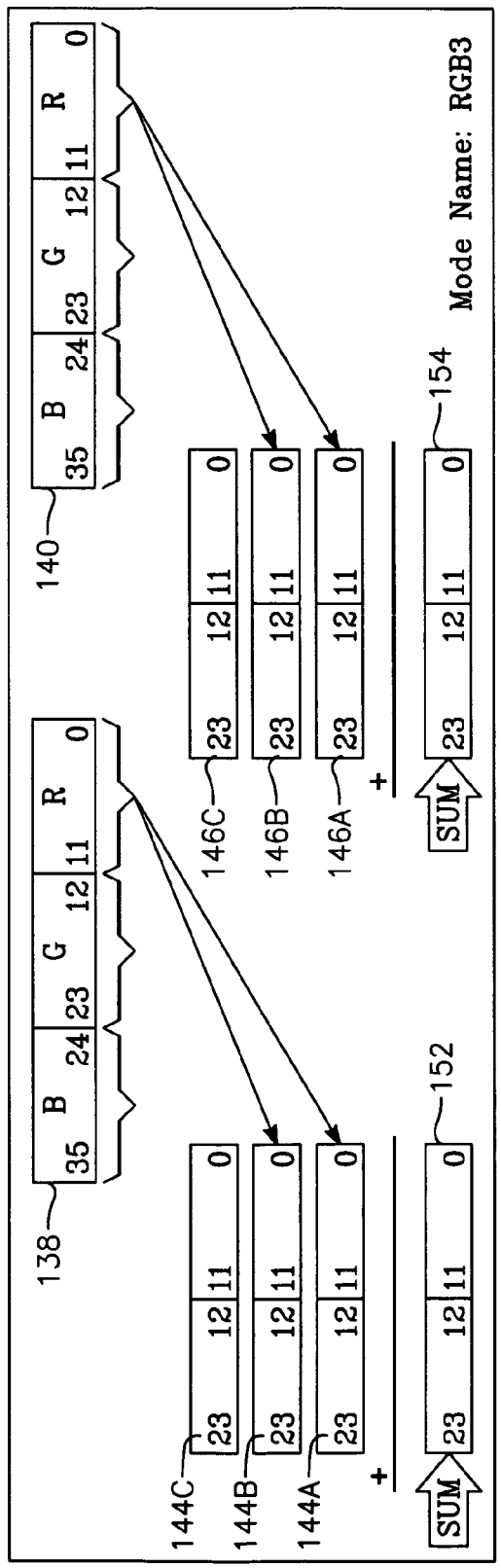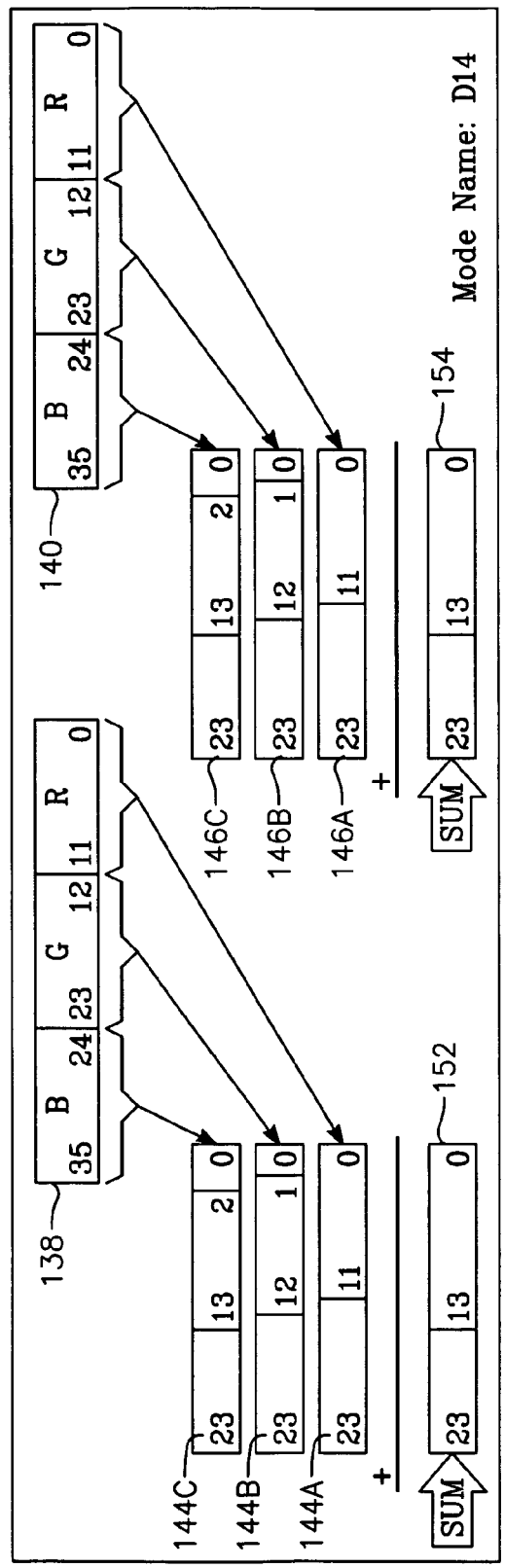

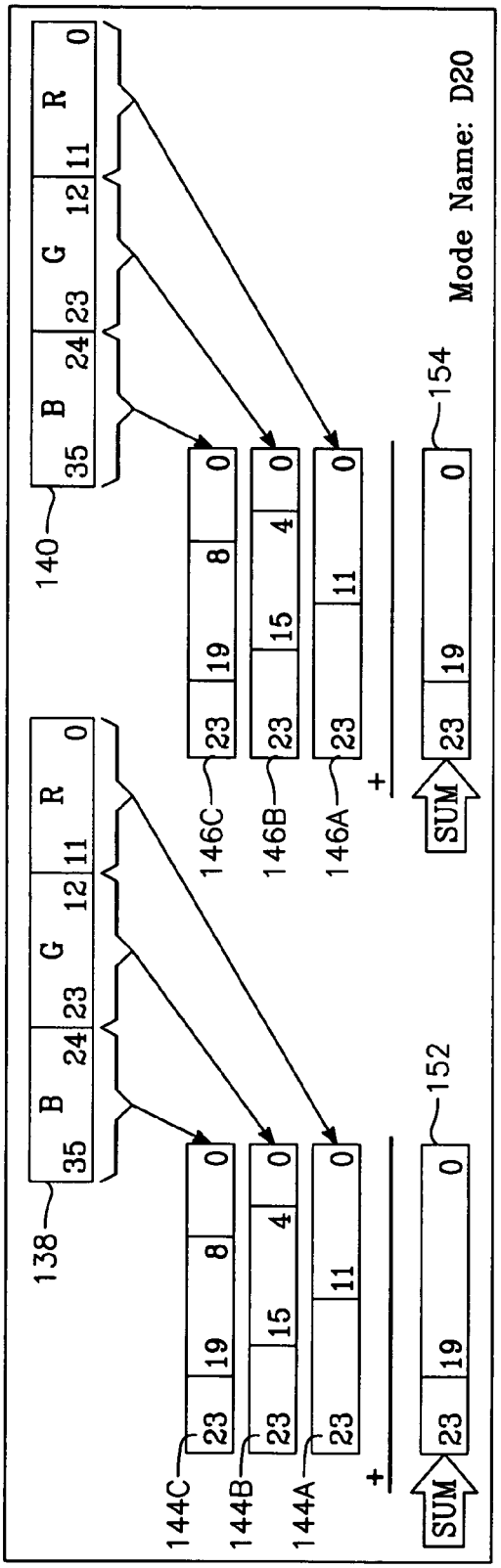
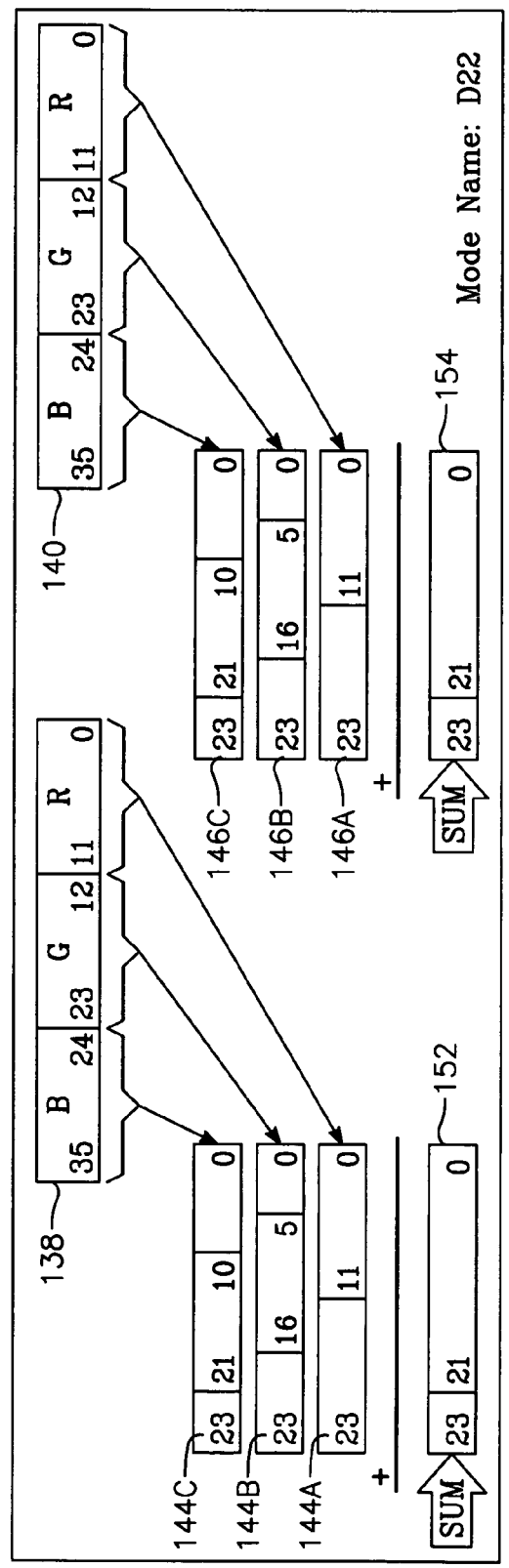
FIG. 9G
FIG. 9H

DIGITAL MULTI-SOURCE MULTI-DESTINATION VIDEO MULTIPLEXER AND CROSSBAR DEVICE

BACKGROUND OF THE INVENTION

1. Field of the Invention

The present invention relates generally to scene simulation systems and methods. More particularly, the present invention relates to complex digital scene simulation systems generated by super-computing machines with outputs from a Digital Video Port (DVP), specialized Personal Computers with outputs from a Digital Visual Interface (DVI), or specialized machines utilizing fiber optic devices with an OC-48 fiber output link.

2. Description of the Prior Art

A variety of weapon systems have been developed that employ advanced high resolution electro-optical/infrared (EO/IR) raster-scan image-based seeker systems. These image-based weapon systems typically utilize advanced signal processing algorithms to increase the probability of target detection and target recognition, with the ultimate goal of accurate target tracking and precise aim-point selection for maximum probability of a kill and minimum collateral damage. Validation of such signal processing algorithms has traditionally been carried out through free flight, captive carry, and static field tests of the image-based weapons systems, followed by lab analysis, modification of the algorithms, and then subsequent field tests followed by further analysis and modifications.

This process is generally costly, time-intensive and time-consuming. Obtaining the correct target and weather conditions can add additional cost and time delay to this test-modify-re-test cycle and is of no use in a simulated or virtual environment.

Recently, the development and testing of signal processing algorithms for EO/IR image-based weapon system electronics has been facilitated by the creation of digital video-based detailed scene injection (DSI). This technique allows realistic testing of image-based weapon system signal processing in the loop (SPIL) electronics in a laboratory environment with complex flight path, target, and weather condition scenarios. Detailed scene injection provides dynamic testing of a weapon system by utilizing spatially, temporally, and spectrally correct images, as rendered by super-computers, such as the Silicon Graphics ONYX II, or video-specialized personal computers, to deliver real-time images to an image-based raster-scanned weapon system.

The use of digital video injection has been limited to imaging weapon systems that employ raster scanning. However, many weapons systems employ EO/IR detectors with scanning techniques other than raster scan, such as frequency modulated (FM) conically-scanned reticle, amplitude modulated (AM) center or outer-nulled) spin-scanned reticle and rosette-scanned detectors. When weapons systems employing these non-raster scanning detectors, digital video injection cannot provide a sufficiently high-resolution, prestored, complex image in real-time to present to the signal processing electronics for processing and system testing.

As new techniques for real time detailed scene convolving are developed, such as the Real Time Detailed Scene Convolver described in U.S. Pat. No. 6,330,373, to solve the real time scene convolving issues, different digital image sources for the scenes being generated are being utilized. When combined with a need to accommodate systems with multi-color, multi-spectral band, and dual-band imagery generated from different processing machines and output from different video pipes with different modes of bit weighting on the red, green, and blue (RGB) color components, the digital hardware must be able to ease the interface between these image generators and the hardware connected to the target. Added to this is the need to accommodate various image sources with differing bit widths or resolution, bit combination schemes, data formats, and pixel-to-pixel output skew, all with minimal throughput latency.

Thus, the present invention was developed to satisfy some of these imaging needs, as well as provide for future application for larger image frame sizes and increased frame rates opening the door to weapons systems which utilize larger two dimensional seeker arrays.

SUMMARY OF THE INVENTION

The present invention provides for a device/system and a method that captures digital imagery from three different sources of digital imagery, which include the Silicon Graphics ONYX II super-computer with a Digital Video Port output, the specialized PC with Digital Video Interface output, or an OC-48 fiber optic general output. The system also supports two independent color bands by utilizing two Silicon Graphic's DVP outputs, or two Personal Computer DVI outputs, which are gen-locked through means of a format specific composite sync (C-SYNC) or vertical and horizontal syncs (V-SYNC, H-SYNC), respectively. Genlock is a method of synchronization involving the generation of a video signal sync-locked with another signal.

A third source which is used is a two-color multiplexed data stream having an OC-48 type fiber optic link. After selection of any one of the three input sources which are DVP input, DVI input of Fiber input, an output format is selected for out putting the image data into the required system format which includes a DVP, DVI, or OC-48 fiber.

BRIEF DESCRIPTION OF THE DRAWINGS

FIGS. 9A-9I are block diagrams which illustrate the processing of DVP formatted video data by the ALIGNMENT/CROSSBAR/0's INSERTER for the Input Field Programmable Gate Array of FIG. 5;

DETAILED DESCRIPTION OF THE PREFERRED EMBODIMENTS

Figure 1:
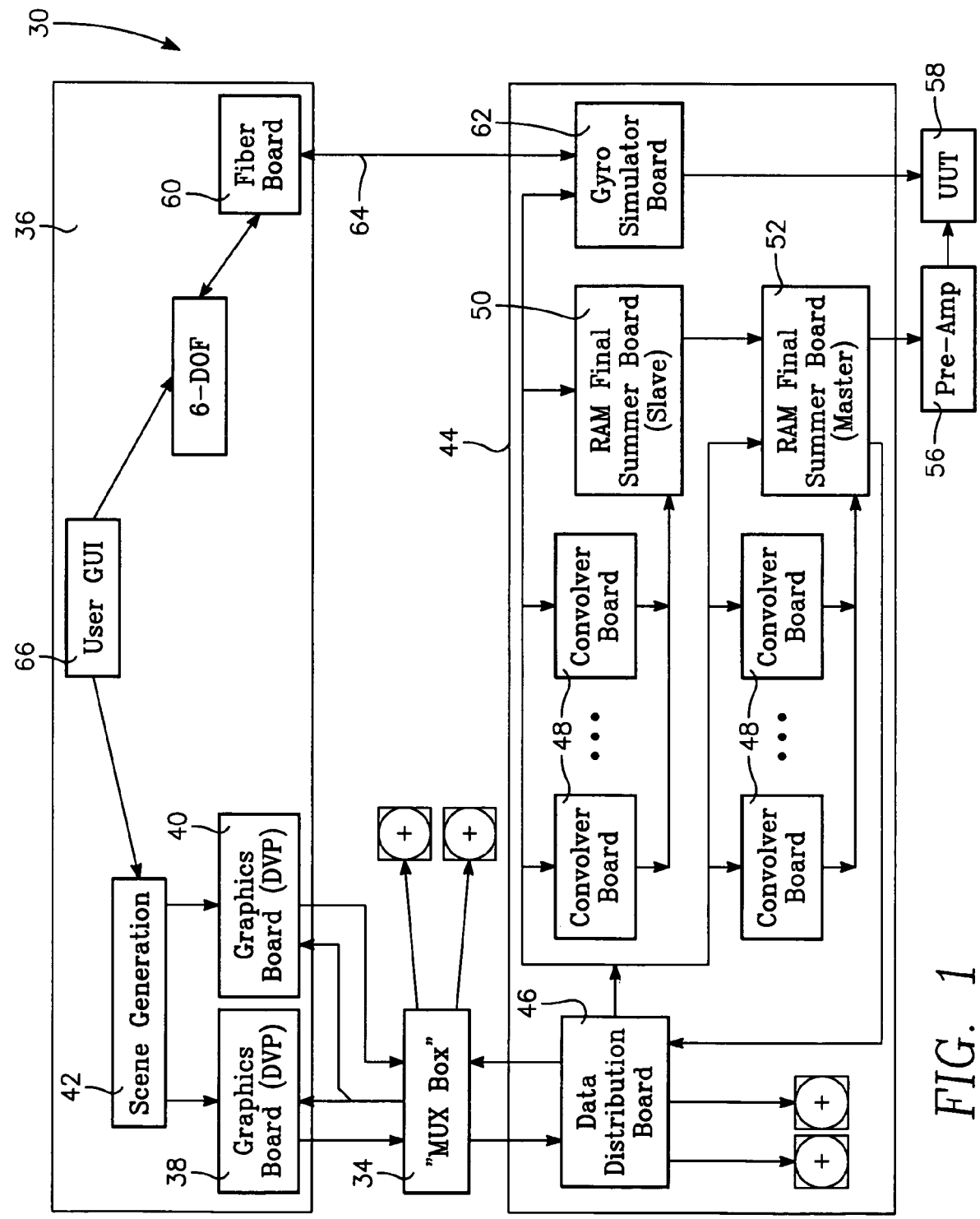
FIGS. 1 and 2 illustrate a first and second operating system configuration for image processing which utilizes a Digital Multipurpose Multi-Destination Video Multiplexer and Crossbar Device comprising the present invention.
Figure 2:
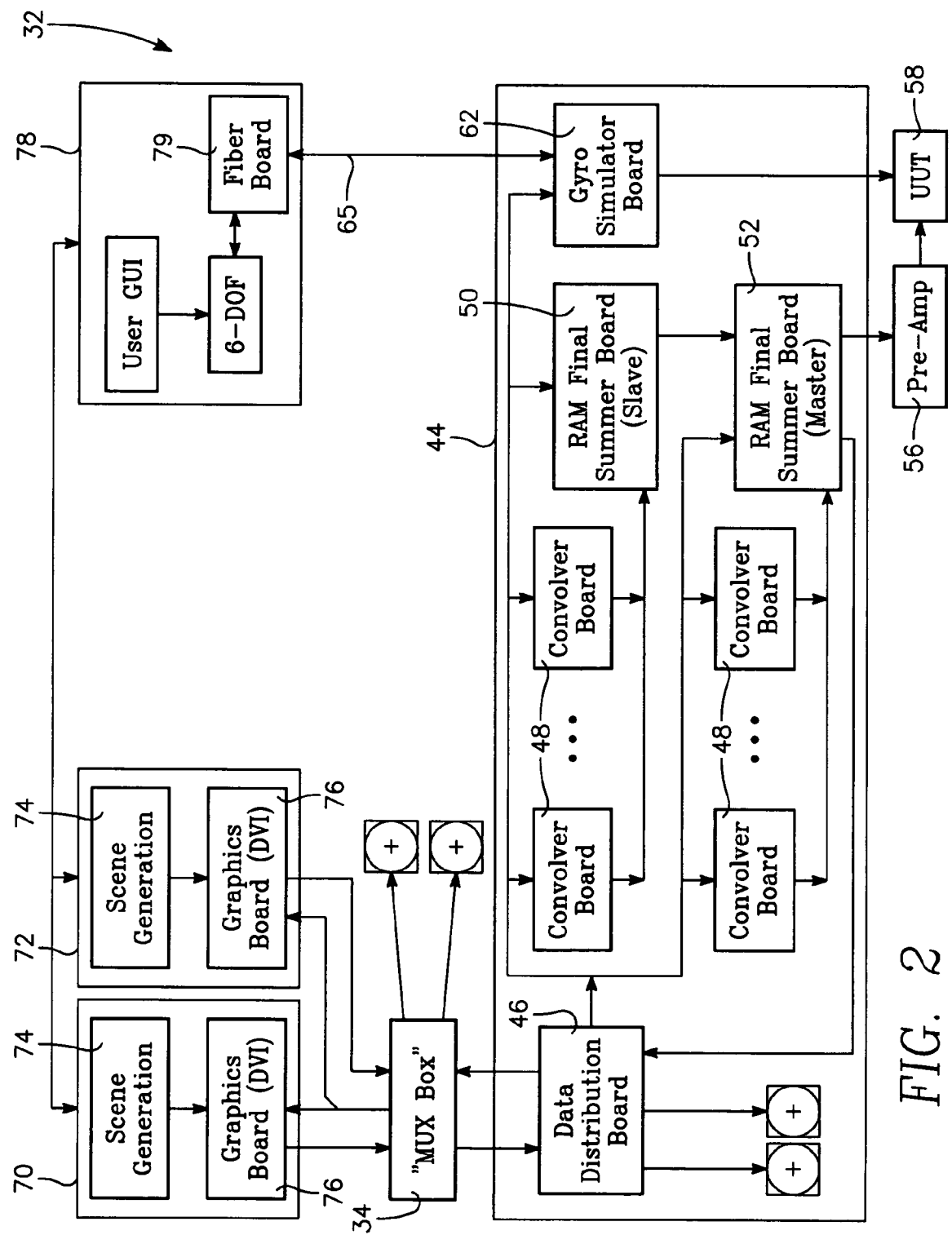

Referring to FIGS. 1 and 2, there is shown in FIGS. 1, and 2 current operating system configurations 30 and 32, respectively, which utilize a Digital Multipurpose Multi-Destination Video Multiplexer and Crossbar Device 34 comprising the present invention. System 30 includes a Silicon Graphics ONYX II super-computer 36 which has a pair of Digital Video Port (DVP) outputs 38 and 40. As shown in FIG. 1, the DVP outputs 38 and 40 are each graphics boards, which are connected to the Multiplexer and Crossbar Device 34. A scene generation unit 42 for generating digital RGB (red green blue) video data is connected to the data inputs for each graphic board 38 and 40. The digital video output of Multiplexer and Crossbar Device 34 is connected to Ram Signal-Processor-in-the-loop Convolver Unit (RSCU) 44. RSCU 44 includes a data distribution board 46 which distributes the RGB video data to a plurality of Convolver boards 48. The outputs of the Convolver boards 48 are connected to a pair of RAM final Summer boards 50 and 52. Summer board 52 is connected to the input of a pre-amplifier board 56, which has its output connected to the Unit/Device Under Test 58.

The Silicon Graphics ONYX II super-computer 36 also has a fiber board 60 which is connected to a Gyro Simulator Board 62 within RSCU 44 via a fiber optic link 64. The Gyro Simulator Board receives Gyro Inertial Data and Control Information via fiber optic link 64 from fiber board 60. User generated unit under test information is provided to a scene generation unit 42 and a fiber device 60 by a User Graphical User Interface 66 which is also connected to the 6-DOF unit illustrated in FIG. 1. The 6-DOF unit is a six degree of freedom software which runs in SGI super computer 36. These elements represent the processing software within the SGI super computer which provide the visual scenes and close the loop around the convolver unit 44.

The operating system configuration 32 in FIG. 2 is almost identical to the system configuration 30 in FIG. 1. Configuration 32 include personal computers 70 and 72 which have scene generation boards 74 and graphics boards 76. The graphics boards 76 within personal computers 70 and 72 have digital visual interface (DVI) outputs which supply RGB video data to Digital Multipurpose Multi-Destination Video Multiplexer and Crossbar Device 34. The RGB video data is processed by Multiplexer and Crossbar Device 34 and then supplied to Ram Signal-Processor-in-the-loop Convolver Unit 44. A third personal computer 78, which includes a fiber board 79 supplies Gyro Inertial Data and Control Information via fiber optic link 65 to Unit 44.

Figure 3:
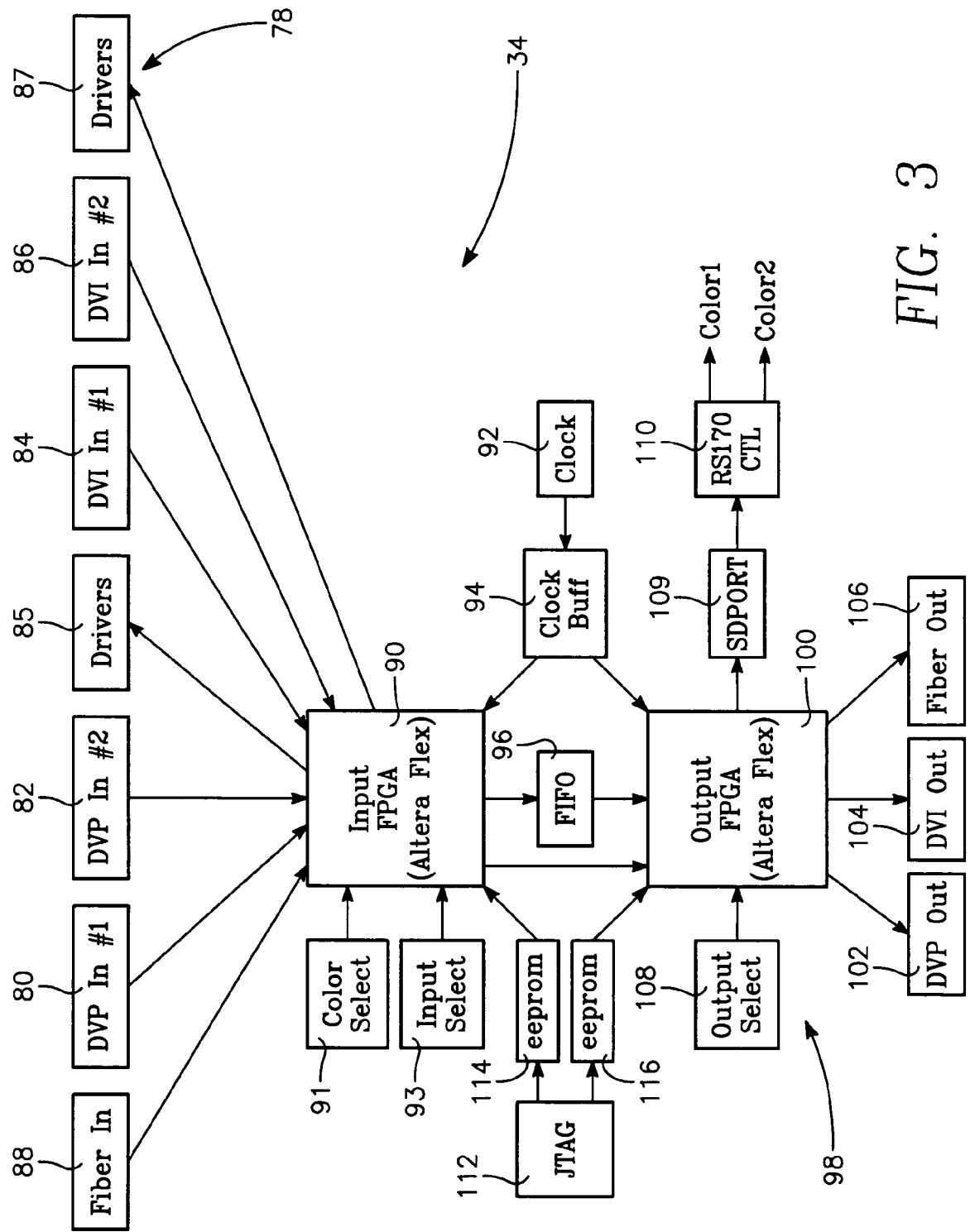
FIG. 3 illustrates a system block diagram of Digital Multipurpose Multi-Destination Video Multiplexer and Crossbar Device comprising the present invention.

Referring to FIG. 3, FIG. 3 illustrates a block diagram of Digital Multipurpose Multi-Destination Video Multiplexer and Crossbar Device 34. Multiplexer and Crossbar Device 34 has an Input Section 78 which receives two DVP formatted input video streams 80 and 82, two DVI formatted video streams 84 and 86, a two color multiplexed OC-48 fiber optic video stream 88, and an auxiliary vertical sync input. Multiplexer and Crossbar Device 34 also has an input select 93 which selects the desired input source based upon the system image generator source (i.e. DVP outputs 38 and 40, DVI outputs 76 of personal computers 70 and 72, or the fiber optic output 79 of personal computer 78) according to the users setting of input select 93.

The Multiplexer and Crossbar Device 34 synchronizes the two input image streams, which may be either DVP formatted streams 80 and 82 or DVI formatted streams 84 and 86, from the selected input source, by utilizing a high speed synchronous first-in-first-out (FIFO) memory located within a field programmable gate array (FPGA) 90, and reading a pair of synchronized image pipes simultaneously out of the FIFO memory within field programmable gate array 90 utilizing a local clock oscillator 92 and clock buffer 94.

The field programmable gate array 90 of Multiplexer and Crossbar Device 34 performs 24-bit specialized bit alignment and crossbar data control with a zero inserting on all unused bits, as selected by the user, to generate separate 24-bit holding registers for the red, green, and blue color components of the video data stream.

The field programmable gate array 90 of Multiplexer and Crossbar Device 34 adds the 24-bit red, green, and blue color components to produce a single 24-bit combined result for each of the synchronized image pipes. The field programmable gate array 90 then combines both 24-bit image pipes into a large 48-bit data register for output to an external output image FIFO 96.

Multiplexer and Crossbar Device 34 has an Output Section 98. The Output Section 98 includes a field programmable gate array 100 which reads the external output image FIFO 96, utilizing local clock oscillator 92 and clock buffer 94, and the received vertical sync and data valid information from the selected input source. The field programmable gate array 100 re-formats the image data into the desired output format (DVP out or DVI out or fiber out) as selected by the users output select 108. The field programmable gate array 100 transmits DVP, DVI, or fiber-formatted data.

Multiplexer and Crossbar Device 34 receives the auxiliary vertical sync input, and drivers 85 and 87 generate vertical, horizontal, and composite syncs based upon a predetermined video image size, format, and frame rate. These signals are used to gen-lock the input source to a known vertical sync.

Field programmable gate array 100 outputs two separate 10-bit image pipe values to a synchronous dual port ram (SDPORT) 109 for a standard video (NTSC format) RS170 display monitor 110.

The Digital Multipurpose Multi-Destination Video Multiplexer and Crossbar Device 34 also has JTAG (Joint Test Action Group) interface 112 which allows for boundary-scan testing of programmable logic devices. The testing routines for programmable gate arrays 90 and 110 are stored in eeproms 114 and 116, respectively.

Figure 4:
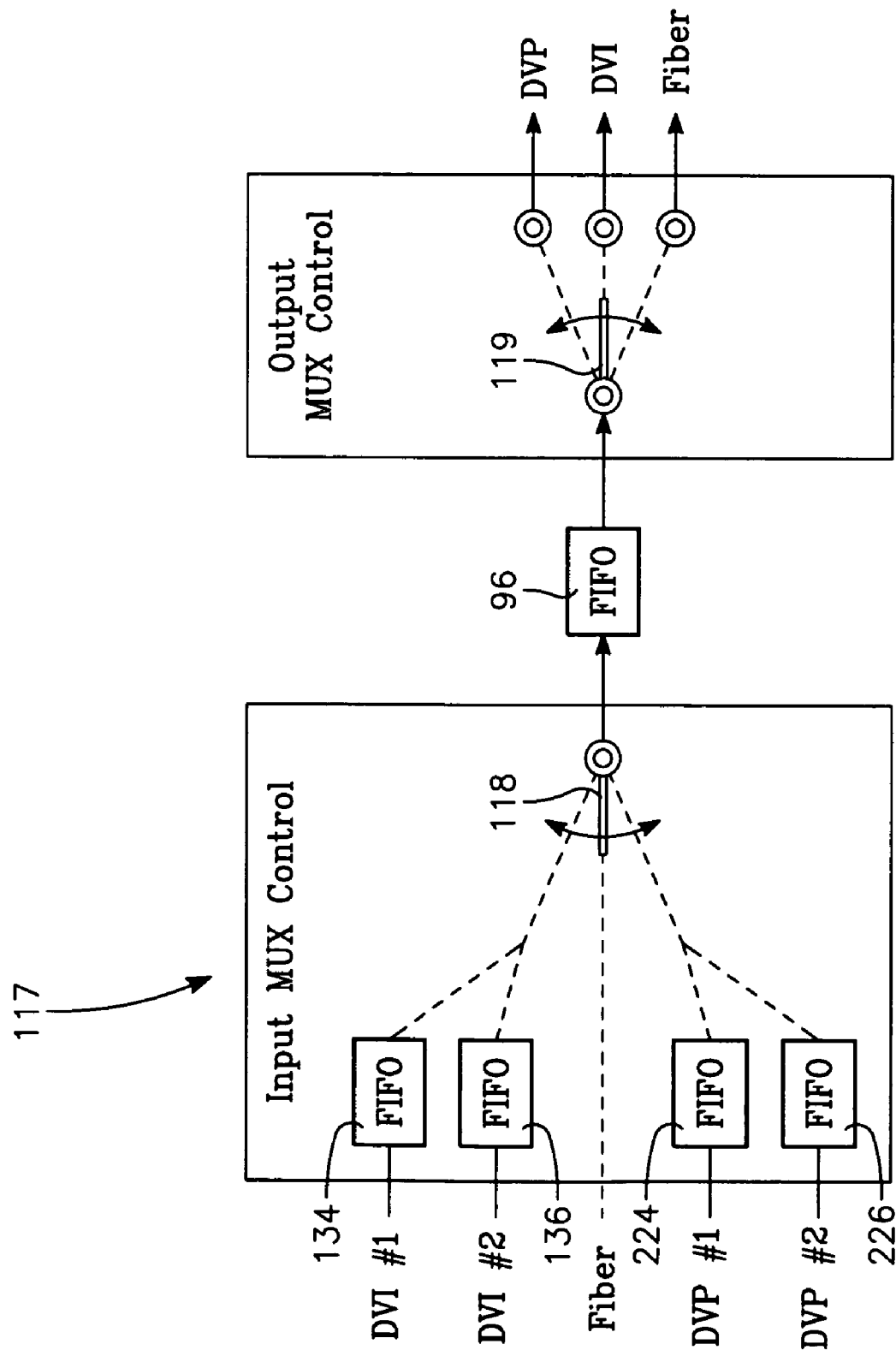
FIG. 4 is a block diagram which illustrates the switching select circuitry and mechanism for providing digital imagery input signals to the Multiplexer and Crossbar Device of FIG. 3.
Figure 5:
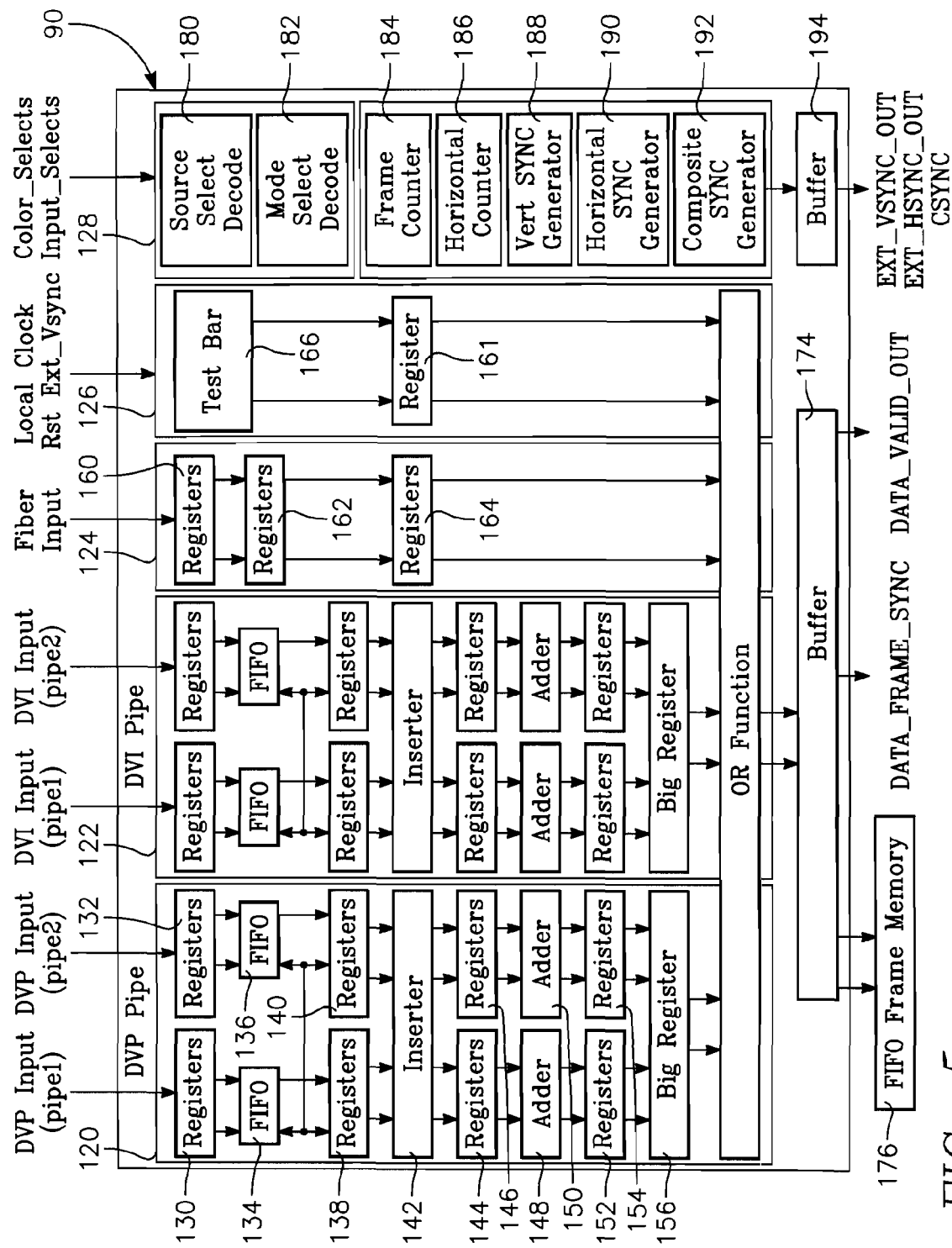
FIG. 5 is a Logic Circuit diagram of the Input Field Programmable Gate Array for the Multiplexer and Crossbar Device of FIG. 3.

Referring to FIGS. 3, 4, 5, 6A and 6B the Input sections of Multiplexer and Crossbar Device 34 are shown in block diagram form in FIG. 5. The Digital Imagery input signals provided to the Input Sections 120, 122, 124, 126 and 128 of FIG. 5 are digital data, clock, and control signals. The digital data consist of DVP Input (pipe1 and pipe2), DVI Input (pipe1 and pipe2) and Fiber Input. The digital clock and control signals consist of a local clock, a reset, an external vertical sync, color selects and input selects.

The Digital Imagery Input signals are received through on-board receivers 127 and 129 (FIG. 6A) from the three different image sources. The three sources are the Digital Video Port (DVP) supplied to Input Section 120, Digital Visual Interface (DVI) supplied to Input Section 122, and the multiplexed OC-48 fiber input supplied to Input Section 124.

All three sources are received and fed into field programmable gate array (FPGA) device 90 (FIG. 3) identified as the Input FPGA in FIG. 3. Only one of the three sources of Digital Imagery is pumped through and processed by the Input FPGA 90 during any given time period. The source of Digital Imagery to be processed is selected within input section 128 by the Input_Selects signal of FIG. 5.

The switching select circuitry and mechanism 117 is shown in FIG. 4. These inputs are set by the user by way of dip switches 118, and must be set before a board reset or power is applied. Circuits within the Input FPGA 90 are designed to utilize the clock enable function on the flip-flops of device 90, which directly inhibit any clocking of the registers on the non-selected source pipes, thus a power-up reset or manual reset must occur after the dip switches 118 have been set. This approach allows high-speed designs to minimize decoding required before the flip-flops and minimizes power consumption.

The binary code for the dip switches 118 is set forth as follows:

| B"00" | DVP#1 and DVP#2 | Multiplexer and Crossbar Device 34 processes DVP formatted input video streams 80 and 82. |
| B"01" | DVI#1 and DVI#2 | Multiplexer and Crossbar Device 34 processes DVI formatted input video streams 84 and 86. |
| B"10" | Fiber(muxed) | Multiplexer and Crossbar Device 34 processes two color multiplexed OC-48 fiber optic video stream 88. |

Figure 6A:
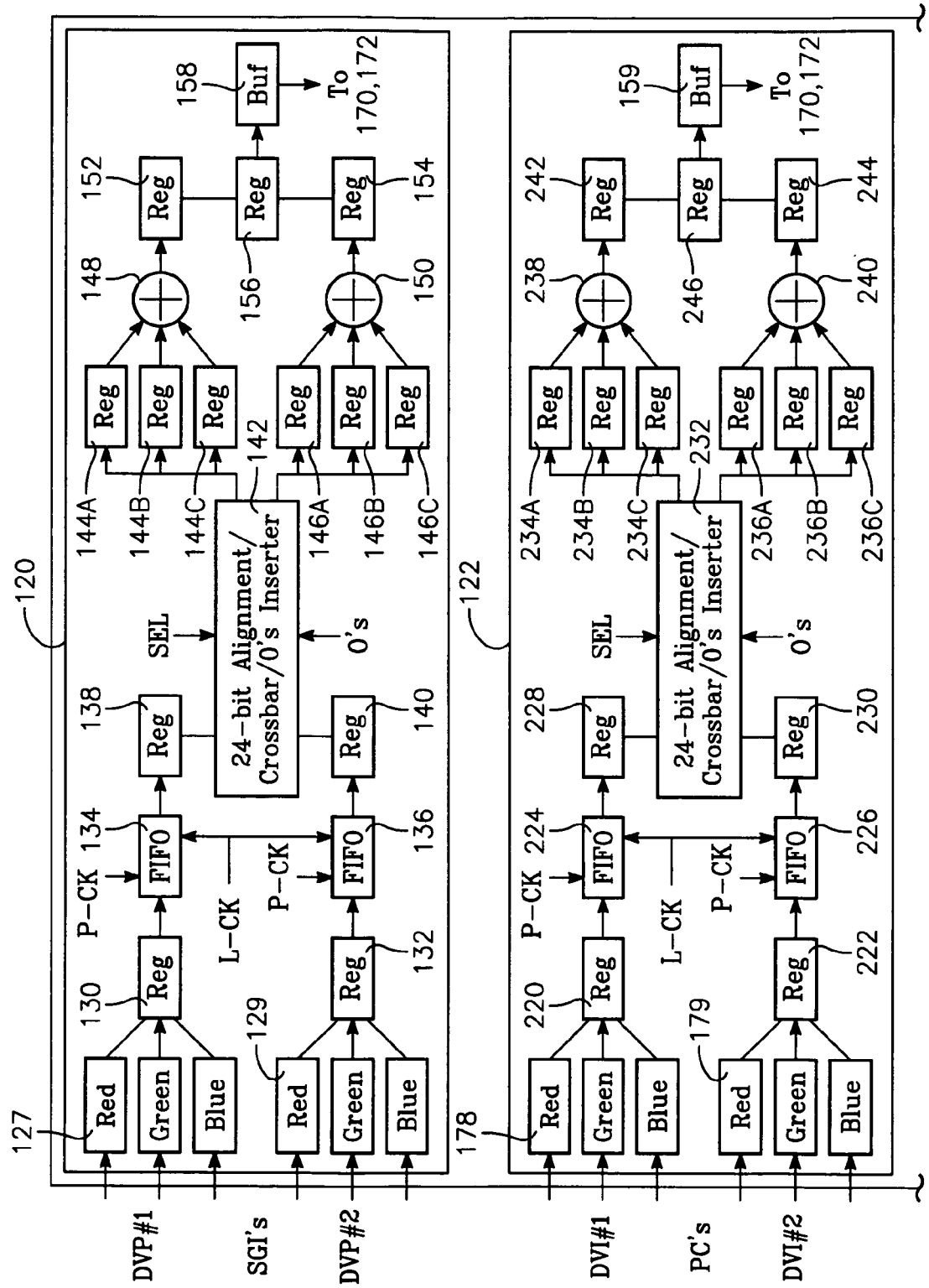
FIGS. 6A and 6B are a detailed Logic Circuit diagram of the Input Field Programmable Gate Array for the Multiplexer and Crossbar Device of FIG. 3.
Figure 6B:
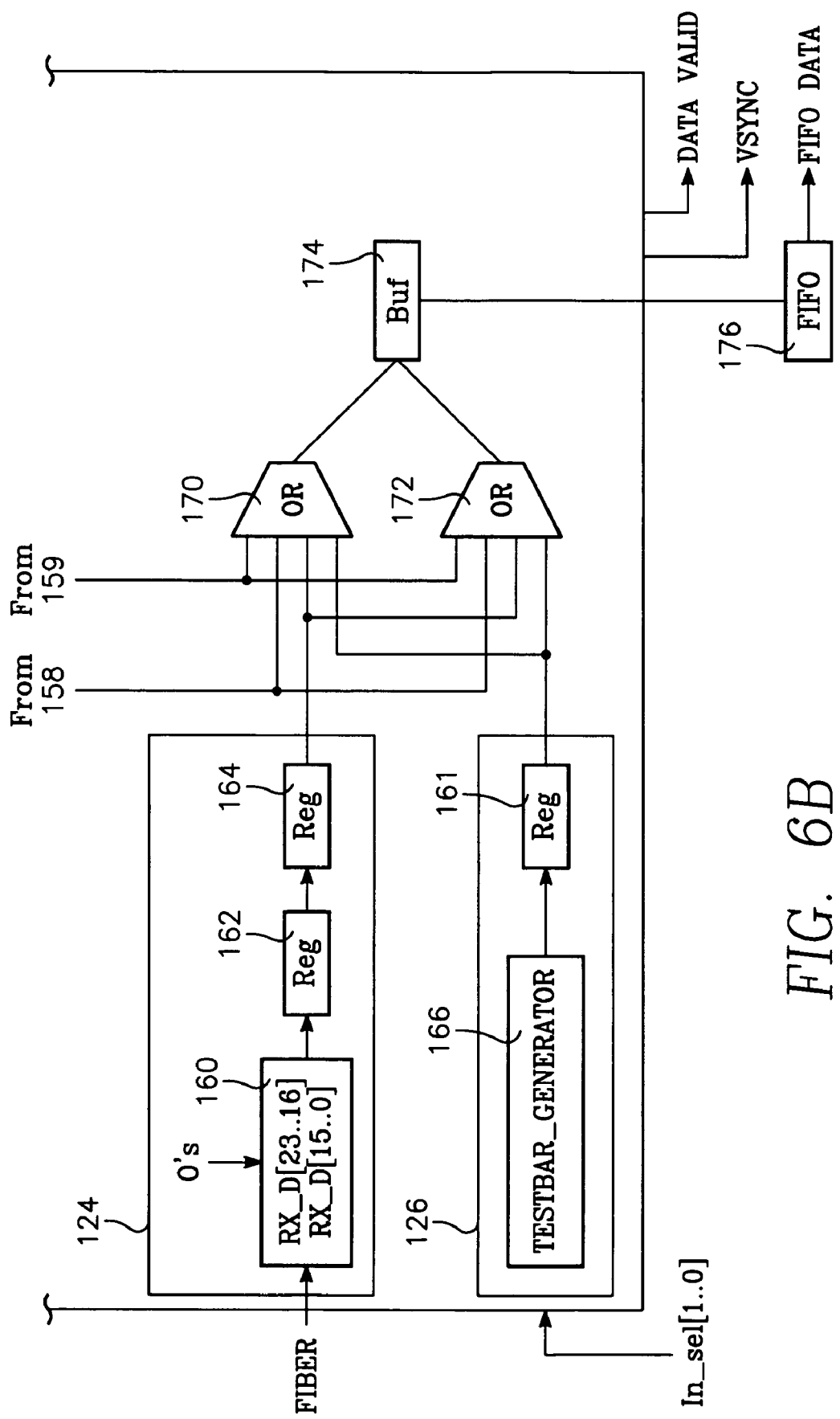

The Digital Video Ports (DVP1 and DVP2) identified in FIG. 3, are generated by two Silicon Graphix OnyxII digital video output pipes. These input pipes include 12-bit RGB data, clock, vsync (vertical sync), and cblank (composite blanking), and are identified as DVP INPUT #1 80 and DVP INPUT #2 82 in FIG. 3. Each of the DVP pipes 80 and 82 has its own path of register arrays 130 or 132 through the Input FPGA device 90 and work on their own clock boundary feeding a pair of internal synchronous first-in-first-out devices (FIFO) 134 and (FIFO) 136 (FIG. 6A). The register arrays 130 and 132 are 36-bit register arrays.

The separate FIFOs 134 and 136 on DVP pipes 80 and 82 allow flexible pixel clock timing such that the DVP pipe 80 and DVP pipe 82 are not synchronized on a pixel-to-pixel basis. However, FIFOs 134 and 136 are gen-locked. Due to the depth of the input FIFOs 134 and 136, the FIFOs exact no more than ten clock cycles of pixel-to-pixel phase delay. The two FIFOs 134 and 136 are then read simultaneously using a DVP INPUT Pipe1's clock (P-CK clock, FIG. 6A) as the read clock. Registers 138 and 140 are then fed DVP formatted video imagery data from FIFOs 134 and 136 and their outputs feed the video imagery data into a ALIGNMENT/CROSSBAR/0's INSERTER 142 illustrated in FIG. 6A. The ALIGNMENT/CROSSBAR/0's INSERTER 142 is where the core of the work on the DVP pipe1 and DVP pipe2 data is performed including different bit combining, multiplexing, and crossbar switching as desired by the users' switch settings identified in FIG. 3 as the Color_Selects input 91.

After the ALIGNMENT/CROSSBAR/0's INSERTER 142 processes the data in conjunction with a bank of registers 144A, 144B, 144C, 146A, 146B, and 146C, the video imagery data is sent to the RGB ADDER 148 and 150. The RGB ADDERs 148 and 150 sum the RGB components of the video imagery data which is the DVP pipe1 and DVP pipe2 data.

The 24-BIT ALIGNMENT\CROSSBAR\0's INSERTER 142 in FIG. 6A provides the following function.

Using the Color_Selects[3 . . . 0] input signals, 24-BIT ALIGNMENT\CROSSBAR\0's INSERTER 142 formulates a mode and utilizes the six 24-bit registers 144A, 144B, 144C, 146A, 146B, and 146C, three 24-bit registers for each pipe 80 and 82, where these 24-bit registers 144A, 144B, 144C, 146A, 146B, and 146C have bit alignment, crossbar muxed, and 0's inserted according to TABLES I and II set forth below, and block diagram depicted in FIGS. 9A-9I.

RGB ADDER 148 performs an unsigned addition of the data from three 24-bit color registers 144A, 144B, and 144C to form a 24-bit sum on the DVP pipe1 data 80. This is also illustrated in FIGS. 9A-9I.

RGB ADDER 154 performs an unsigned addition of the data from three 24-bit color registers 146A, 146B, and 146C to form a 24-bit sum on the DVP pipe1 data 82. This is also illustrated in FIGS. 9A-9I.

Data output from RGB ADDER 148 is supplied to a 24-bit register 152, while data output from RGB ADDER 154 is supplied to a 24-bit register 154. The data outputs from RGB ADDERS 148 and 154 are supplied to a 48-bit register 156 with bits 23 . . . 0 being assigned to the contents of register 152 and bits 47 . . . 24 being assigned to the contents of register 154. The DVP formatted data then passes through a buffer 158, OR gates 170 and 172 and a buffer 174 into an external FIFO frame memory/output image FIFO 176.

TABLE I

| INPUT SELECT Color_Sel | PIPE 1 RED, GREEN, BLUE OUTPUT DATA REGISTERS | | |
|---|---|---|---|
| [3 . . . 0] (mode name) | SGI_one_R_data_reg [x . . . x] | SGI_one_G_data_reg [x . . . x] | SGI_one_B_data_reg [x . . . x] |
| H"0"(RGB1) | [11 . . . 0] = A[11 . . . 0] | [23 . . . 12] = A[23 . . . 12] | H"00000" |
| H"1"(RGB2) | [11 . . . 0] = A[11 . . . 0] | [23 . . . 12] = B[11 . . . 0] | H"00000" |
| H"2"(RGB3) | [11 . . . 0] = A[11 . . . 0] | [23 . . . 12] = A[11 . . . 0] | H"00000" |
| H"3" | H"00000" | H"00000" | H"00000" |
| H"4"(D14) | [11 . . . 0] = A[11 . . . 0] | [12 . . . 1] = A[23 . . . 12] | [13 . . . 2] = A[35 . . . 24] |
| H"5"(D16) | [11 . . . 0] = A[11 . . . 0] | [13 . . . 2] = A[23 . . . 12] | [15 . . . 4] = A[35 . . . 24] |
| H"6"(D18) | [11 . . . 0] = A[11 . . . 0] | [14 . . . 3] = A[23 . . . 12] | [17 . . . 6] = A[35 . . . 24] |
| H"7"(D20) | [11 . . . 0] = A[11 . . . 0] | [15 . . . 4] = A[23 . . . 12] | [19 . . . 8] = A[35 . . . 24] |
| H"8"(D22) | [11 . . . 0] = A[11 . . . 0] | [16 . . . 5] = A[23 . . . 12] | [21 . . . 10] = A[35 . . . 24] |
| H"9"(D24) | [11 . . . 0] = A[11 . . . 0] | [17 . . . 6] = A[23 . . . 12] | [23 . . . 12] = A[35 . . . 24] |

TABLE I-continued

| INPUT SELECT Color_Sel | PIPE 1 RED, GREEN, BLUE OUTPUT DATA REGISTERS | | |
|---|---|---|---|
| [3 . . . 0] (mode name) | SGI_one_R_data_reg [x . . . x] | SGI_one_G_data_reg [x . . . x] | SGI_one_B_data_reg [x . . . x] |
| H"A" | H"00000" | H"00000" | H"00000" |
| H"B" | H"00000" | H"00000" | H"00000" |
| H"C" | H"00000" | H"00000" | H"00000" |
| H"D" | H"00000" | H"00000" | H"00000" |
| H"E" | H"00000" | H"00000" | H"00000" |
| H"F" | H"00000" | H"00000" | H"00000" |

Short hand names defined:
A[x . . . x] = SGI_one_hold_reg[x . . . x]
B[x . . . x] = SGI_two_hold_reg[x . . . x]

TABLE II

| INPUT SELECT Color_Sel | PIPE 2 RED, GREEN, BLUE OUTPUT DATA REGISTERS | | |
|---|---|---|---|
| [3 . . . 0] (mode name) | SGI_two_R_data_reg [x . . . x] | SGI_two_G_data_reg [x . . . x] | SGI_two_B_data_reg [x . . . x] |
| H"0"(RGB1) | [11 . . . 0] = B[11 . . . 0] | [23 . . . 12] = B[23 . . . 12] | H"00000" |
| H"1"(RGB2) | [11 . . . 0] = A[11 . . . 0] | [23 . . . 12] = B[11 . . . 0] | H"00000" |
| H"2"(RGB3) | [11 . . . 0] = B[11 . . . 0] | [23 . . . 12] = B[11 . . . 0] | H"00000" |
| H"3" | H"00000" | H"00000" | H"00000" |
| H"4"(D14) | [11 . . . 0] = B[11 . . . 0] | [12 . . . 1] = B[23 . . . 12] | [13 . . . 2] = B[35 . . . 24] |
| H"5"(D16) | [11 . . . 0] = B[11 . . . 0] | [13 . . . 2] = B[23 . . . 12] | [15 . . . 4] = B[35 . . . 24] |
| H"6"(D18) | [11 . . . 0] = B[11 . . . 0] | [14 . . . 3] = B[23 . . . 12] | [17 . . . 6] = B[35 . . . 24] |
| H"7"(D20) | [11 . . . 0] = B[11 . . . 0] | [15 . . . 4] = B[23 . . . 12] | [19 . . . 8] = B[35 . . . 24] |
| H"8"(D22) | [11 . . . 0] = B[11 . . . 0] | [16 . . . 5] = B[23 . . . 12] | [21 . . . 10] = B[35 . . . 24] |
| H"9"(D24) | [11 . . . 0] = B[11 . . . 0] | [17 . . . 6] = B[23 . . . 12] | [23 . . . 12] = B[35 . . . 24] |
| H"A" | H"00000" | H"00000" | H"00000" |
| H"B" | H"00000" | H"00000" | H"00000" |
| H"C" | H"00000" | H"00000" | H"00000" |
| H"D" | H"00000" | H"00000" | H"00000" |
| H"E" | H"00000" | H"00000" | H"00000" |
| H"F" | H"00000" | H"00000" | H"00000" |

Short hand names defined:
A[x . . . x] = SGI_one_hold_reg[x . . . x]
B[x . . . x] = SGI_two_hold_reg[x . . . x]

Referring to FIGS. 9A-9I, FIG. 9A illustrates the operation of ALIGNMENT/CROSSBAR/0's INSERTER 142 on data bits received from holding registers 138 and 140 when the mode is RGB1 which hexadecimal zero. Bits 11 . . . 0 of register 138 are transferred to register 144A and become Bits 11 . . . 0 of register 144A. Bits 23 . . . 12 of register 138 are transferred to register 144B and become Bits 23 . . . 12 of register 144B. Bits 35 . . . 24 of register 138 are unused. Zeros are inserted in bits 23 . . . 12 of register 144A, bits 11 . . . 0 of register 144B and bits 23 . . . 0 of register 144C. The contents of registers 144A, 144B, and 144C are summed by ADDER 148 and supplied to register 152.

Bits 11 . . . 0 of register 140 are transferred to register 146A and become Bits 11 . . . 0 of register 146A. Bits 23 . . . 12 of register 140 are transferred to register 146B and become Bits 23 . . . 12 of register 146B. Bits 35 . . . 24 of register 140 are unused. Zeros are inserted in bits 23 . . . 12 of register 146A, bits 11 . . . 0 of register 146B and bits 23 . . . 0 of register 146C. The contents of registers 146A, 146B, 146C are summed by ADDER 150 and supplied to register 154.

The operation of ALIGNMENT/CROSSBAR/0's INSERTER 142 in the RGB1 mode is also illustrated in Tables I and II. In Table I SGI_one_R_data_reg is register 144A of FIG. 6A, SGI_one_G_data_reg is register 144B and SGI_one_B_data_reg is register 144C. In Table II SGI_two_R_data_reg is register 146A of FIG. 6A, SGI_two_G_data_reg is register 146B and SGI_two_B_data_reg is register 146C.

Figure 9A:
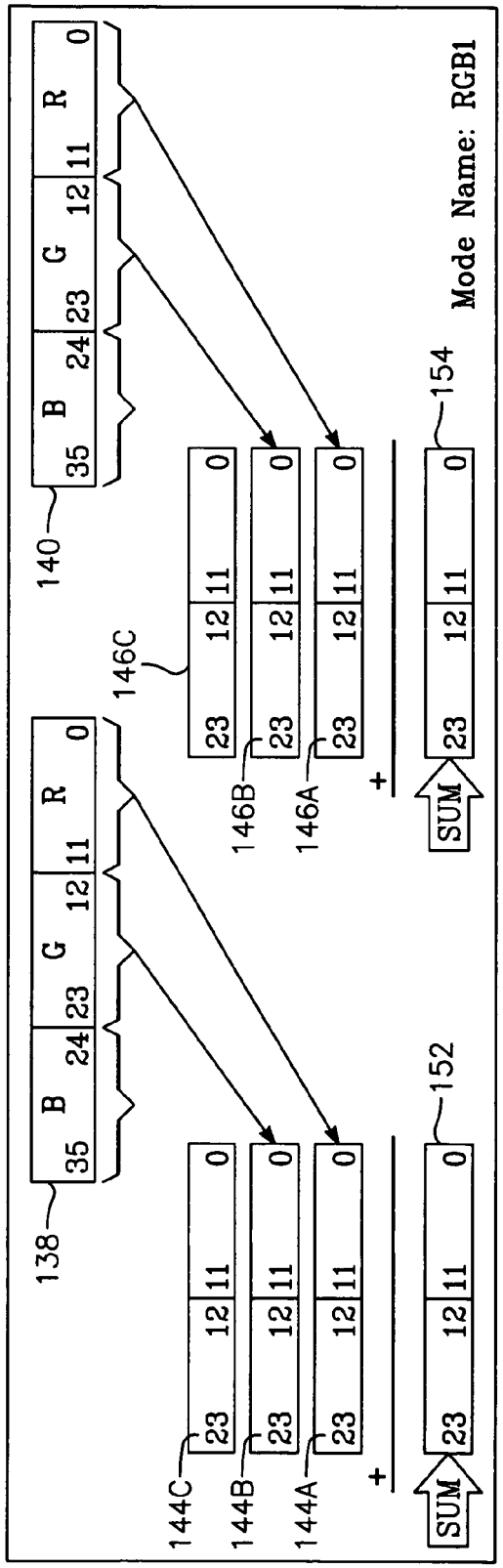
Figure 9B:
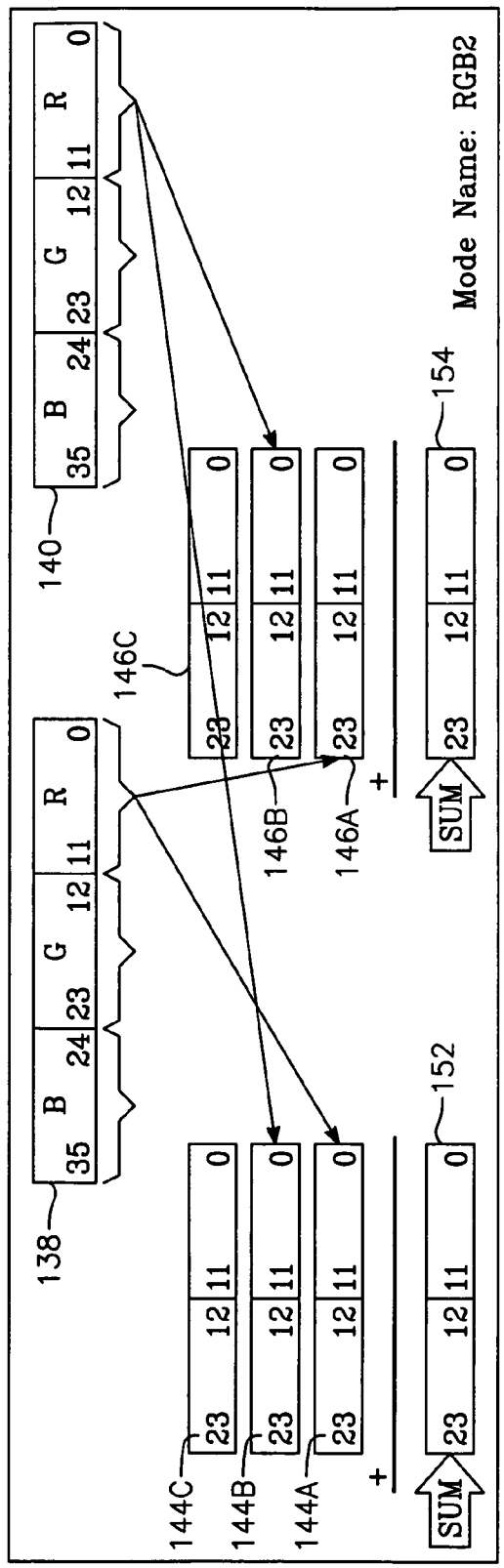
Figure 9E:
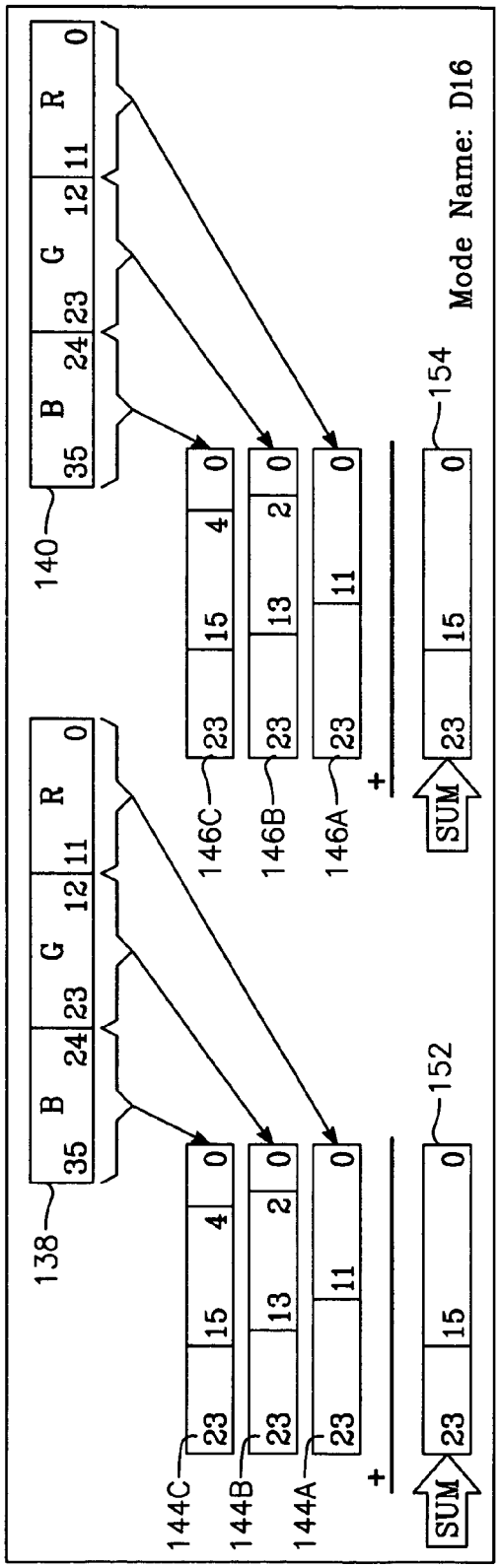
Figure 9F:
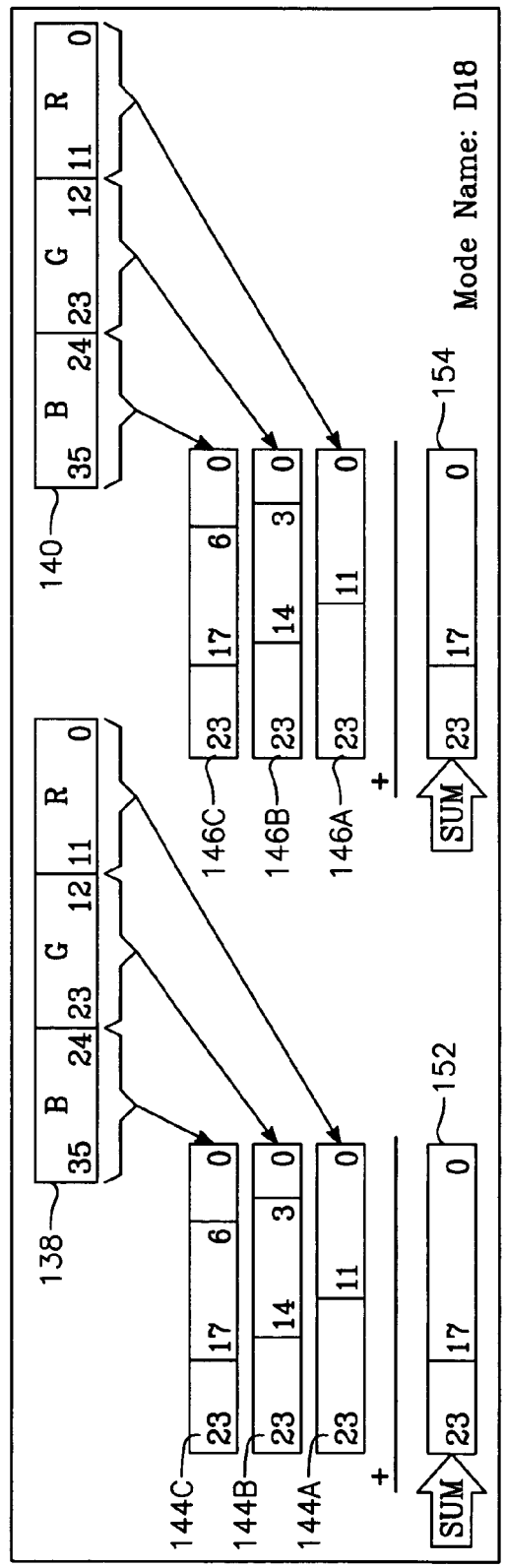
Figure 9I:
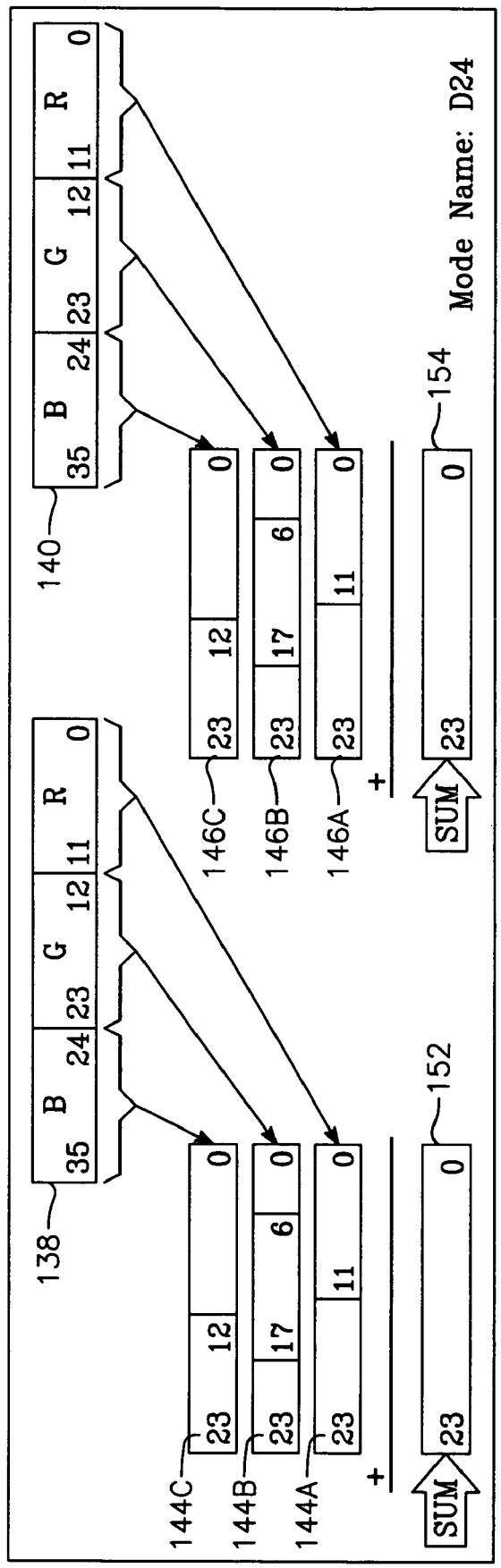

FIG. 9B illustrates the operation of ALIGNMENT/CROSSBAR/0's INSERTER 142 on data bits received from registers 138 and 140 when the mode is RGB2 which is hexadecimal one. Bits 11 . . . 0 of register 138 are transferred to register 144A and become Bits 11 . . . 0 of register 144A. Bits 11 . . . 0 of register 140 are transferred to register 144B and become Bits 23 . . . 12 of register 144B. Bits 35 . . . 24 of register 138 are unused. Zeros are inserted in bits 23 . . . 12 of register 144A, bits 11 . . . 0 of register 144B and register 144C. The contents of registers 144A, 144B, and 144C are summed by ADDER 148 and supplied to register 152.

Bits 11 . . . 0 of register 140 are transferred to register 146A and become Bits 23 . . . 12 of register 146A. Bits 23 . . . 12 of register 140 are transferred to register 146B and become Bits 23 . . . 12 of register 146B. Bits 35 . . . 24 of register 140 are unused. Zeros are inserted in bits 23 . . . 12 of register 146A, bits 0 . . . 11 of register 146B and bits 23 . . . 0 of register 146C. The contents of registers 146A, 146B, 146C are summed by ADDER 150 and supplied to register 154.

FIG. 9C illustrates the operation of ALIGNMENT/ CROSSBAR/0's INSERTER 142 on data bits received from registers 138 and 140 when the mode is RGB3 which is hexadecimal two. Bits 11 ... 0 of register 138 are transferred to register 144A and become Bits 11 ... 0 of register 144A. Bits 11 ... 0 of register 138 are transferred to register 144B and become Bits 23 ... 12 of register 144B. Bits 35 ... 12 of register 138 are unused. Zeros are inserted in bits 23 ... 12 of register 144A, bits 11 ... 0 of register 144B and bits 23 ... 0 of register 144C. The contents of registers 144A, 144B, and 144C are summed by ADDER 148 and supplied to register 152.

Bits 11 ... 0 of register 140 are transferred to register 146A and become Bits 11 ... 0 of register 146A. Bits 11 ... 0 of register 140 are transferred to register 146B and become Bits 23 ... 12 of register 146B. Bits 35 ... 12 of register 140 are unused. Zeros are inserted in bits 23 ... 12 of register 146A, bits 11 ... 0 of register 146B and bits 23 ... 0 of register 146C. The contents of registers 146A, 146B, 146C are summed by ADDER 150 and supplied to register 154.

FIGS. 9D, 9E, 9F, 9G, 9H and 9I illustrate the operation of ALIGNMENT/CROSSBAR/0's INSERTER 142 on data bits received from registers 138 and 140 when the modes are D14, D16, D18, D20, D22 and D24, respectively. Tables I and II also illustrate the D14, D16, D18, D20, D22 and D24 with respect to the DVI formatted streams. Therefore these modes are not discussed in detail.

Referring to FIGS. 3, 5, 6A an 6B, the Digital Visual Ports (DVI) 84 and 86, identified in FIG. 3, are generated by two personal computers 70 and 72 (FIG. 2) digital video output pipes. These input pipes 84 and 86 include 8-bit RGB data, clock, vsync (vertical sync), and hsync (horizontal sync) signals, and are identified as DVI INPUT (Pipe1) and DVI INPUT (Pipe2). Each of the DVI pipes 84 and 86 has its own path of large register arrays through the Input FPGA device 90 and work on their own clock boundry feeding internal synchronous first-in-first-out devices (FIFOs 224 and 226 which are illustrated in FIG. 6A). The separate FIFOs 224 and 226 on each pipe 84 and 86 allow flexible pixel clock timing such that the pipes 84 and 86 need not be synchronized on a pixel-to-pixel basis. However, the pipes 84 and 86 are genlocked. Due to the depth of the input FIFOs 224 and 226, the FIFOs 224 and 226 exact no more than ten clock cycles of pixel-to-pixel phase delay. The FIFOs 224 and 226 are then read simultaneously using DVI INPUT Pipe1's clock (P-CK clock, FIG. 6A) as the read clock.

Register 228 receives the DVI formatted video data from FIFO 224 and register 230 receives the DVI formatted video data from FIFO 226. The outputs of registers 228 and 230 feed into the ALIGNMENT/CROSSBAR/0's INSERTER 232. The ALIGNMENT/CROSSBAR/0's INSERTER 232 is where the core of the work on the DVI pipe1 data 84 and the DVI pipe2 data 86 is performed including different bit combining, multiplexing, and crossbar switching as desired by the users' switch settings identified in FIG. 3 as the Color_Selects input 91. A bank of registers 234A, 234B, 234C, 236A, 236B and 236C is also utilized to process the DVI formatted video data before the data is sent to a pair RGB ADDERs 238 and 240. The RGB ADDER 238 and 240 sum the RGB components of the DVI formatted video streams 84 and 86.

Using the Color_Selects[3 ... 0] input signals, 24-BIT ALIGNMENT\ CROSSBAR\0's INSERTER 232 formulates a mode and utilizes the six 24-bit registers 234A, 234B, 234C, 236A, 236B, and 236C, three 24-bit registers for each pipe 84 and 86, where these 24-bit registers 234A, 234B, 234C, 236A, 236B, and 236C have bit alignment, crossbar muxed, and 0's inserted according to TABLES III and IV set forth below, and block diagram depicted in FIGS. 10A-10E.

RGB ADDER 238 performs an unsigned addition of the data from three 24-bit color registers 234A, 234B, and 234C to form a 24-bit sum on the DVP pipe1 data 84. This is also illustrated in FIGS. 10A-10E.

RGB ADDER 240 performs an unsigned addition of the data from three 24-bit color registers 236A, 236B, and 236C to form a 24-bit sum on the DVP pipe1 data 86. This is also illustrated in FIGS. 10A-10E.

Data output from RGB ADDER 238 is supplied to a 24-bit register 242, while data output from RGB ADDER 240 is supplied to a 24-bit register 244. The data outputs from RGB ADDERS 242 and 244 are supplied to a 48-bit register 159 with bits 23 ... 0 being assigned to the contents of register 242 and bits 47 ... 24 being assigned to the contents of register 244. The DVI formatted data then passes through a buffer 159, OR gates 170 and 172 and a buffer 174 into an external FIFO frame memory 176.

TABLE III

| INPUT SELECT Color_Sel | PIPE 1 RED, GREEN, BLUE OUTPUT DATA REGISTERS | | |
|---|---|---|---|
| [3 ... 0] (mode name) | DVI_one_R_data_reg [x ... x] | DVI_one_G_data_reg [x ... x] | DVI_one_B_data_reg [x ... x] |
| H"0" | H"00000" | H"00000" | H"00000" |
| H"1" | H"00000" | H"00000" | H"00000" |
| H"2" | H"00000" | H"00000" | H"00000" |
| H"3" | H"00000" | H"00000" | H"00000" |
| H"4" | H"00000" | H"00000" | H"00000" |
| H"5" | H"00000" | H"00000" | H"00000" |
| H"6" | H"00000" | H"00000" | H"00000" |
| H"7" | H"00000" | H"00000" | H"00000" |
| H"8" | H"00000" | H"00000" | H"00000" |
| H"9" | H"00000" | H"00000" | H"00000" |
| H"A"(RGB4) | [7 ... 0] = C[23 ... 16] | [15 ... 8] = C[15 ... 8] | [23 ... 16] = C[7 ... 0] |

TABLE III-continued

| INPUT SELECT Color_Sel | PIPE 1 RED, GREEN, BLUE OUTPUT DATA REGISTERS | | |
|---|---|---|---|
| [3...0] (mode name) | DVI_one_R_data_reg [x...x] | DVI_one_G_data_reg [x...x] | DVI_one_B_data_reg [x...x] |
| H"B"(E12) | [7...0] = C[23...16] | [9...2] = C[15...8] | [11...4] = C[7...0] |
| H"C"(E14) | [7...0] = C[23...16] | [10...3] = C[15...8] | [13...6] = C[7...0] |
| H"D"(E16) | [7...0] = C[23...16] | [11...4] = C[15...8] | [15...8] = C[7...0] |
| H"E"(E20) | [7...0] = C[23...16] | [13...6] = C[15...8] | [19...12] = C[7...0] |
| H"F" | H"00000" | H"00000" | H"00000" |

Short hand names defined:
A[x...x] = SGI_one_hold_reg[x...x]
B[x...x] = SGI_two_hold_reg[x...x]

TABLE IV

| INPUT SELECT Color_Sel | PIPE 2 RED, GREEN, BLUE OUTPUT DATA REGISTERS | | |
|---|---|---|---|
| [3...0] (mode name) | DVI_one_R_data_reg [x...x] | DVI_one_G_data_reg [x...x] | DVI_one_B_data_reg [x...x] |
| H"0" | H"00000" | H"00000" | H"00000" |
| H"1" | H"00000" | H"00000" | H"00000" |
| H"2" | H"00000" | H"00000" | H"00000" |
| H"3" | H"00000" | H"00000" | H"00000" |
| H"4" | H"00000" | H"00000" | H"00000" |
| H"5" | H"00000" | H"00000" | H"00000" |
| H"6" | H"00000" | H"00000" | H"00000" |
| H"7" | H"00000" | H"00000" | H"00000" |
| H"8" | H"00000" | H"00000" | H"00000" |
| H"9" | H"00000" | H"00000" | H"00000" |
| H"A"(RGB4) | [7...0] = D[23...16] | [15...8] = D[15...8] | [23...16] = D[7...0] |
| H"B"(E12) | [7...0] = D[23...16] | [9...2] = D[15...8] | [11...4] = D[7...0] |
| H"C"(E14) | [7...0] = D[23...16] | [10...3] = D[15...8] | [13...6] = D[7...0] |
| H"D"(E16) | [7...0] = D[23...16] | [11...4] = D[15...8] | [15...8] = D[7...0] |
| H"E"(E20) | [7...0] = D[23...16] | [13...6] = D[15...8] | [19...12] = C[7...0] |
| H"F" | H"00000" | H"00000" | H"00000" |

Short hand names defined:
A[x...x] = DVI_one_hold_reg[x...x]
B[x...x] = DVI_two_hold_reg[x...x]

Referring to FIGS. 10A-10E, FIG. 10A illustrates the operation of ALIGNMENT/CROSSBAR/0's INSERTER 232 on data bits received from holding registers 228 and 230 when the mode is RGB4 which hexadecimal "A". Bits 23 ... 16 of register 228 are transferred to register 234A and become Bits 7 ... 0 of register 234A. Bits 15 ... 8 of register 228 are transferred to register 234B and become Bits 15 ... 8 of register 234B. Bits 7 ... 0 of register 228 are transferred to register 234C and become bits 23 ... 16 in register 234C. Zeros are inserted in bits 23 ... 8 of register 234A, bits 7 ... 0 and 23 ... 16 of register 234B and bits 15 ... 0 of register 234C. The contents of registers 234A, 234B, and 234C are summed by ADDER 238 and supplied to register 242.

Bits 23 ... 16 of register 230 are transferred to register 236A and become Bits 7 ... 0 of register 236A. Bits 15 ... 8 of register 230 are transferred to register 236B and become Bits 15 ... 8 of register 236B. Bits 7 ... 0 of register 230 are transferred to register 236C and become bits 23 ... 16 in register 236C. Zeros are inserted in bits 23 ... 8 of register 236A, bits 7 ... 0 and 23 ... 16 of register 236B and bits 15 ... 0 of register 236C. The contents of registers 236A, 236B, and 236C are summed by ADDER 240 and supplied to register 244.

The operation of ALIGNMENT/CROSSBAR/0's INSERTER 232 in the RGB1 mode is also illustrated in Tables III and IV. In Table III DVI_one_R_data_reg is register 234A of FIG. 6A, DVI_one_G_data_reg is register 234B and DVI_one_B_data_reg is register 234C. In Table II DVI_two_R_data_reg is register 236A of FIG. 6A, DVI_two_G_data_reg is register 236B and DVI_two_B_data_reg is register 236C.

Figure 10A:
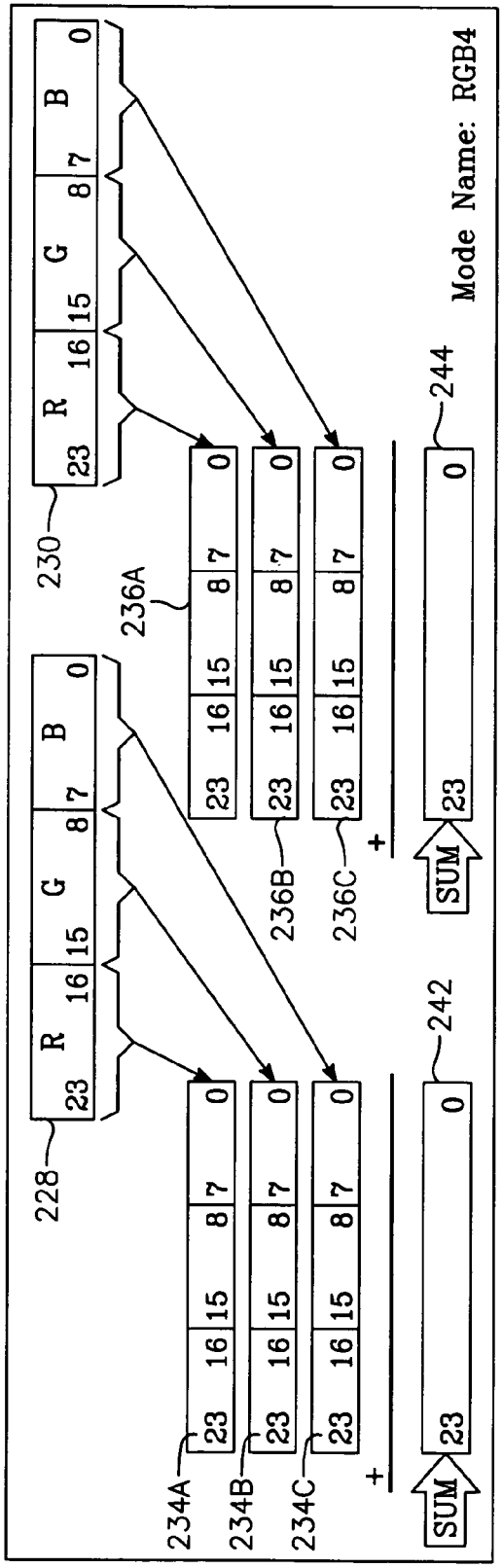
FIGS. 10A-10E are block diagrams which illustrate the processing of DVI formatted video data by the ALIGN- MENT/CROSSBAR/0's INSERTER for the Input Field Programmable Gate Array of FIG. 5.
Figure 10B:
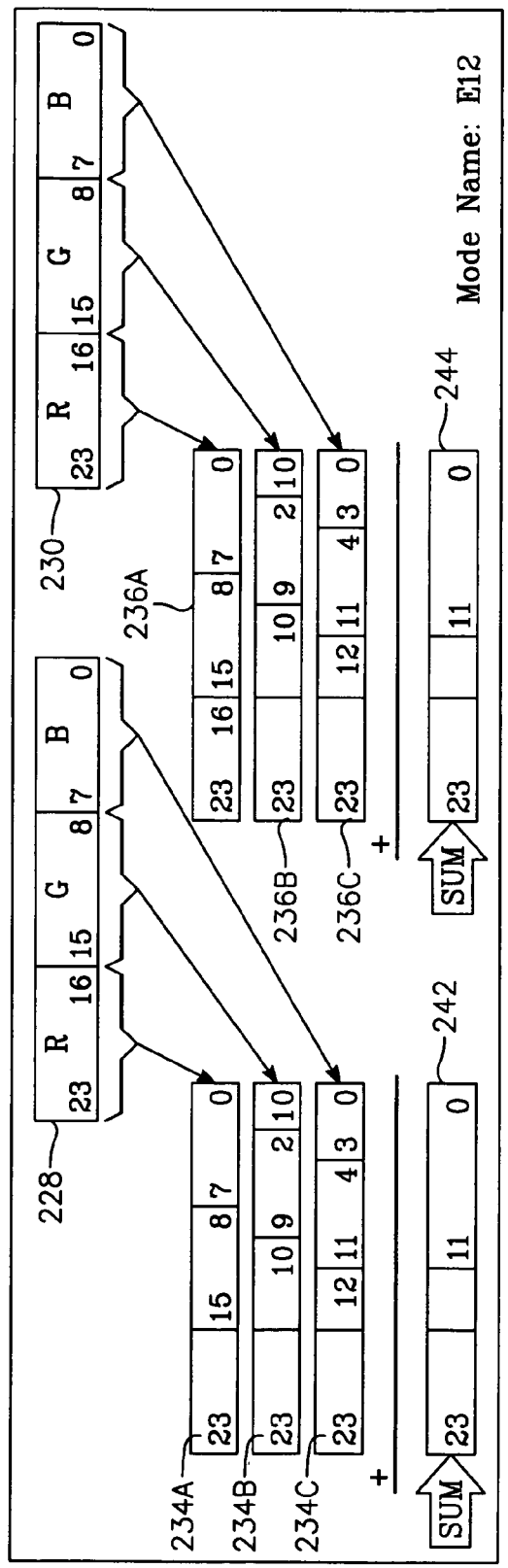

FIG. 10B illustrates the operation of ALIGNMENT/CROSSBAR/0's INSERTER 232 on data bits received from holding registers 228 and 230 when the mode is E12 which hexadecimal "B". Bits 23 ... 16 of register 228 are transferred to register 234A and become Bits 7 ... 0 of register 234A. Bits 15 ... 8 of register 228 are transferred to register 234B and become Bits 9 ... 2 of register 234B. Bits 7 ... 0 of register 228 are transferred to register 234C and become bits 11 ... 4 in register 234C. Zeros are inserted in bits 23 ... 8 of register 234A, bits 1 ... 0 and 23 ... 10 of register 234B and bits 3 ... 0 and 23 ... 12 of register 234C. The contents of registers 234A, 234B, and 234C are summed by ADDER 238 and supplied to register 242.

Bits 23 ... 16 of register 230 are transferred to register 236A and become Bits 7 ... 0 of register 236A. Bits 15 ... 8 of register 230 are transferred to register 236B and become Bits 9 ... 2 of register 236B. Bits 7 ... 0 of register 230 are transferred to register 236C and become bits 11 ... 4 in register 236C. Zeros are inserted in bits 23 ... 8 of register 236A, bits 1 ... 0 and 23 ... 10 of register 236B and bits 3 ... 0 and 23 ... 12 of register 236C. The contents of registers 236A, 236B, and 236C are summed by ADDER 240 and supplied to register 244.

Figure 10C:
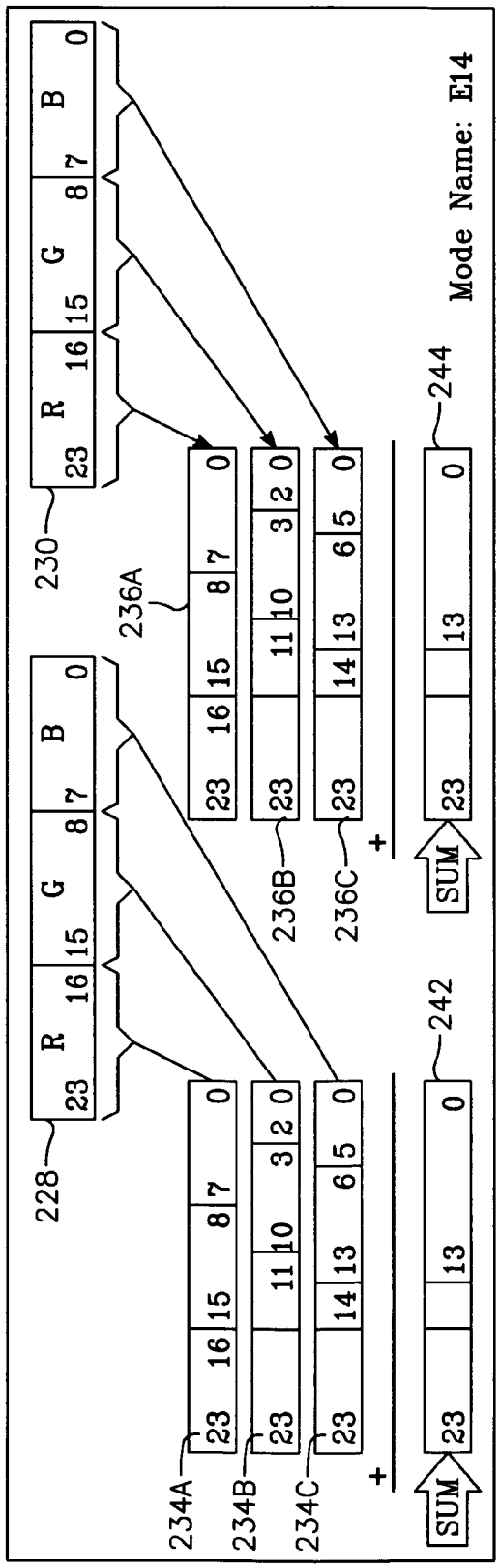
Figure 10D:
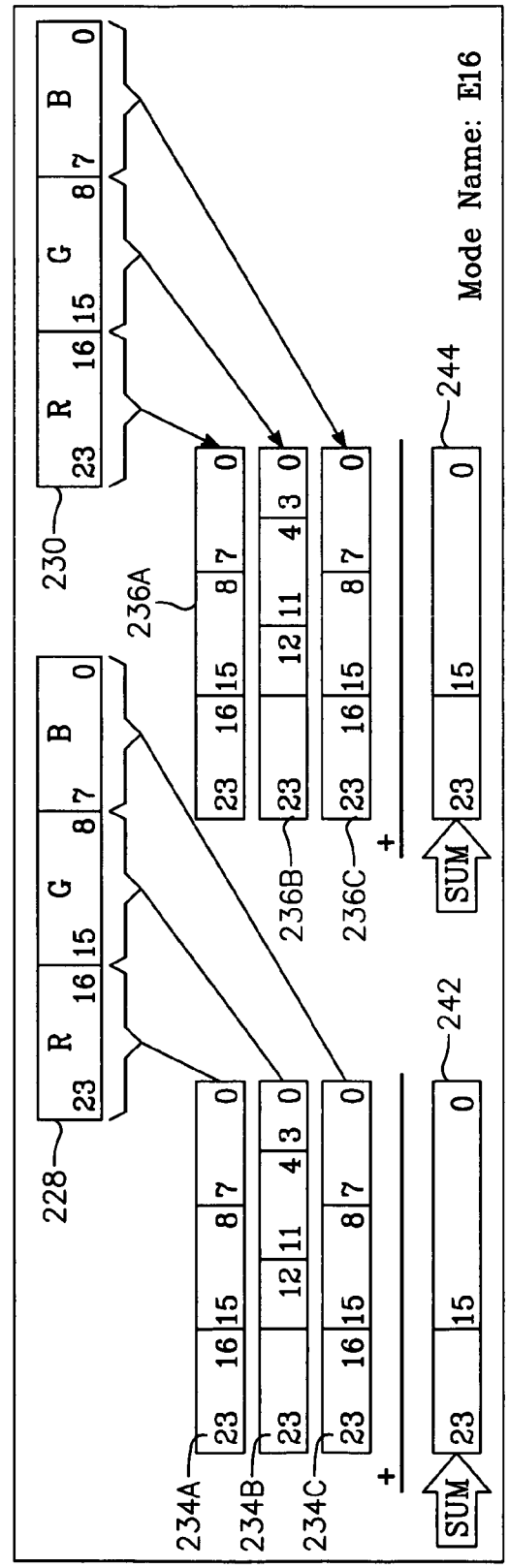
Figure 10E:
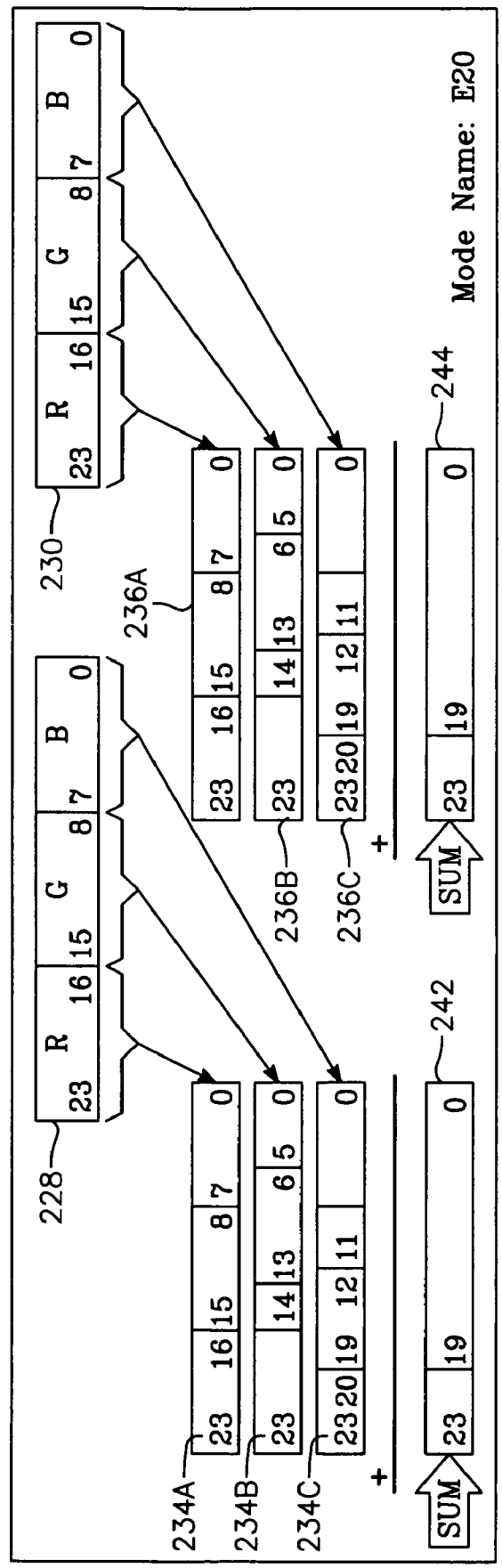

FIGS. 10C, 10D, and 10E illustrate the operation of ALIGNMENT/CROSSBAR/0's INSERTER 232 on data bits received from registers 228 and 230 when the modes are E14, E16, and E18, respectively. Tables II and IV also illustrate the modes E14, E16, and E18 with respect to the DVI formatted streams. Therefore these modes are not discussed in detail.

The FIBER optic port is generated by an OC-48 type, such as personal computer 78, which contains multiplexed 24-bit two color image data 88 (FIG. 3). The data is received as 16-bit parallel data, then provided directly through the input section 124 of field programmable gate array (FPGA) 90, with no bit alignment performed or demultiplexing performed, to the output image FIFO. Input section 124 includes a registers 160, 162 and 164.

The TEST port 126 identified in FIG. 5 uses no external inputs other than the clock and reset. This circuitry uses counters to form a bar graph used for test and verification only. The TEST port 126 includes a TESTBAR_GENERATOR 166 and a register 161.

Figure 7A:
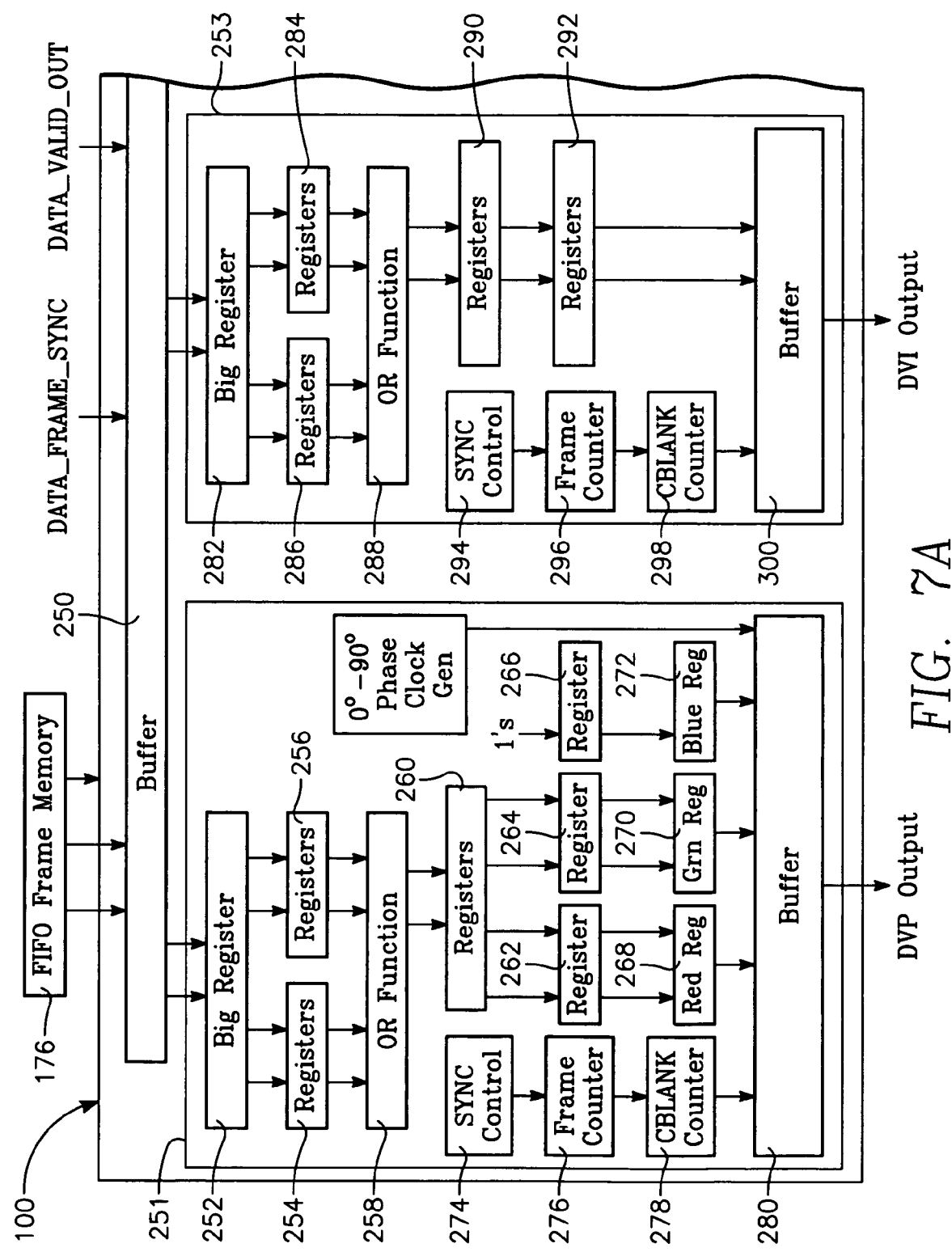
FIGS. 7A and 7B are a Logic Circuit diagram of the Output Field Programmable Gate Array for the Multiplexer and Crossbar Device of FIG. 3.
Figure 7B:
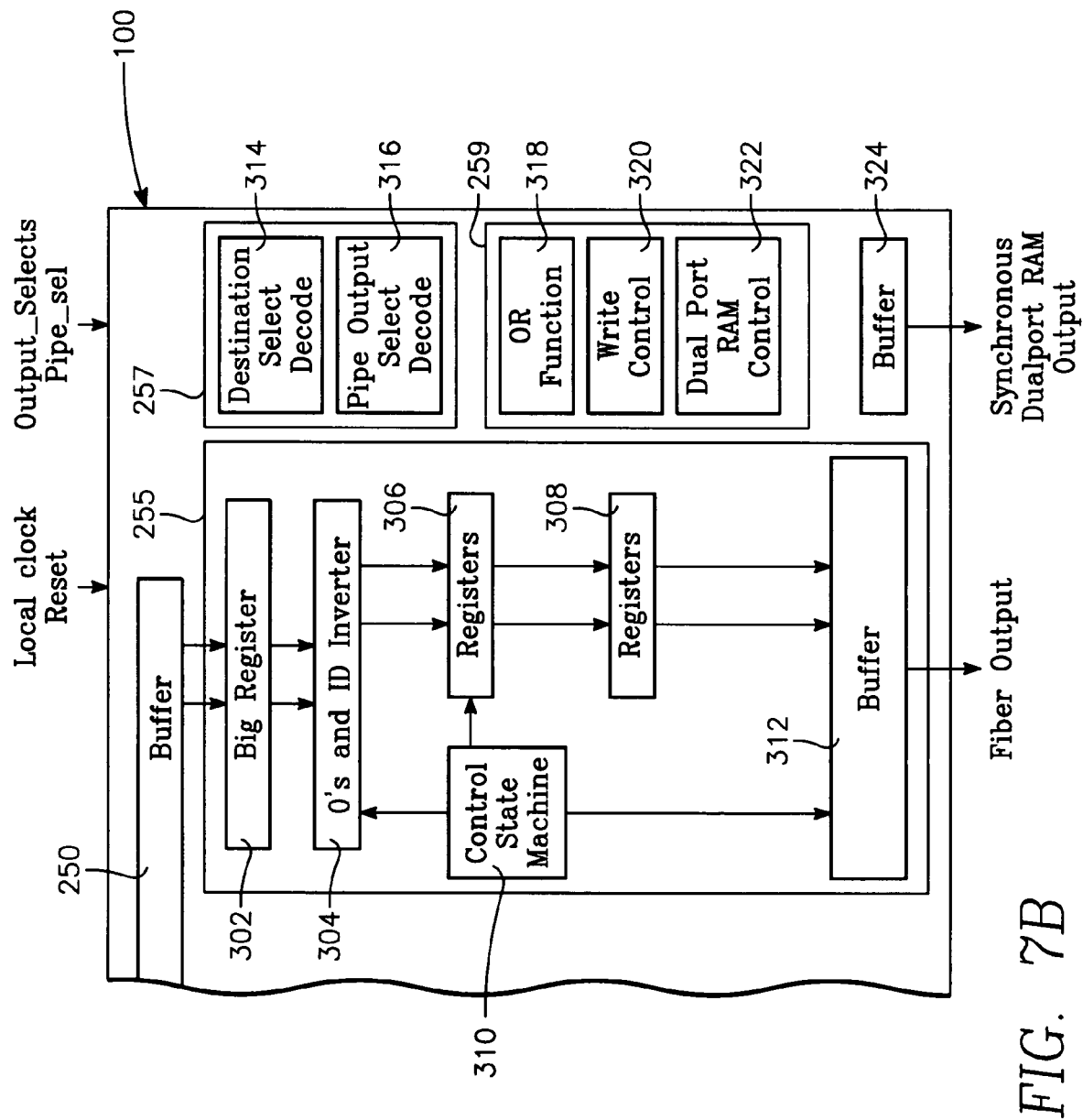

Referring to FIGS. 3, 7A, 7B and 8, the Output sections 251, 253, 255, 257 and 259 of FPGA 100 are shown in block diagram form in FIGS. 7A and 7B. The inputs to the Output sections 251, 253, 255, 257 and 259 of FPGA 100 are digital data, clock, and control signals are received from the Input FPGA 90 and the external FIFO 96 shown in FIG. 3. Utilizing local clock oscillator 92 to provide for local clock domain synchronization, the external FIFO 96 is read and the data is input to Output FPGA 100.

Only one of the output formats (DVP out 102, DVI out 104 or Fiber out 106) is generated from the FPGA 100 within a given time frame. The user selects the output, identified as Output_Selects in FIG. 7B with the switching selection mechanism shown in FIG. 4. The video data is delivered to the selected pipe and then formatted to the desired output.

The output selects (DVP, DVI or fiber) are set by the user by way of dip switches 119 (FIG. 4). The user must set the dip switches 119 before a board reset or power is applied. The binary code for the dip switches 119 is set forth as follows:

| B"00" | None | Multiplexer and Crossbar Device 34 does not provide video data. |
|---|---|---|
| B"01" | FIBER | Multiplexer and Crossbar Device 34 provides OC-48 fiber optic video stream 106. |
| B"10" | DVP | Multiplexer and Crossbar Device 34 provides DVP formatted output video stream 102. |
| B"110" | DVI | Multiplexer and Crossbar Device 34 provides DVI formatted output video stream 104. |

Circuits within the Output FPGA 100 are designed to utilize the clock enable function of the flip-flops with the output Field Programmable Gate Array 100, which directly inhibits any clocking of the registers on the non-selected output pipes (DVP out 102, DVI out 104 and Fiber out 106). A power-up reset or manual reset must occur after the dip switches 119 have been set. This approach allows high-speed designs to minimize decoding required before the flip-flops and minimizes power consumption.

The Digital Video Port (DVP OUTPUT) identified in FIG. 7A, is generated in accordance with the DVP standard output as defined by the Silicon Graphix OnyxII digital video output pipes, using a preset video image size and frame rate. This output is 12-bit RGB video stream with vertical sync and composite blank signals generated for receiver timing. The input data is read as 48-bit data from the external FIFO 96, then broken up into two 24-bit pipes which pass through buffer 250, register 252 and then registers 254 and 256 which have their outputs connected to OR Function gate 258. Using the input identified as the Pipe_sel (pipe select) in FIG. 7B, one of the two 24-bit pipes is chosen as the source for the output. This is accomplished utilizing register 254 which receives a Select_PIPE1 signal, register 256 which receives a Select_PIPE2 signal and the OR Function gate 258 of FIG. 7A.

Figure 8:
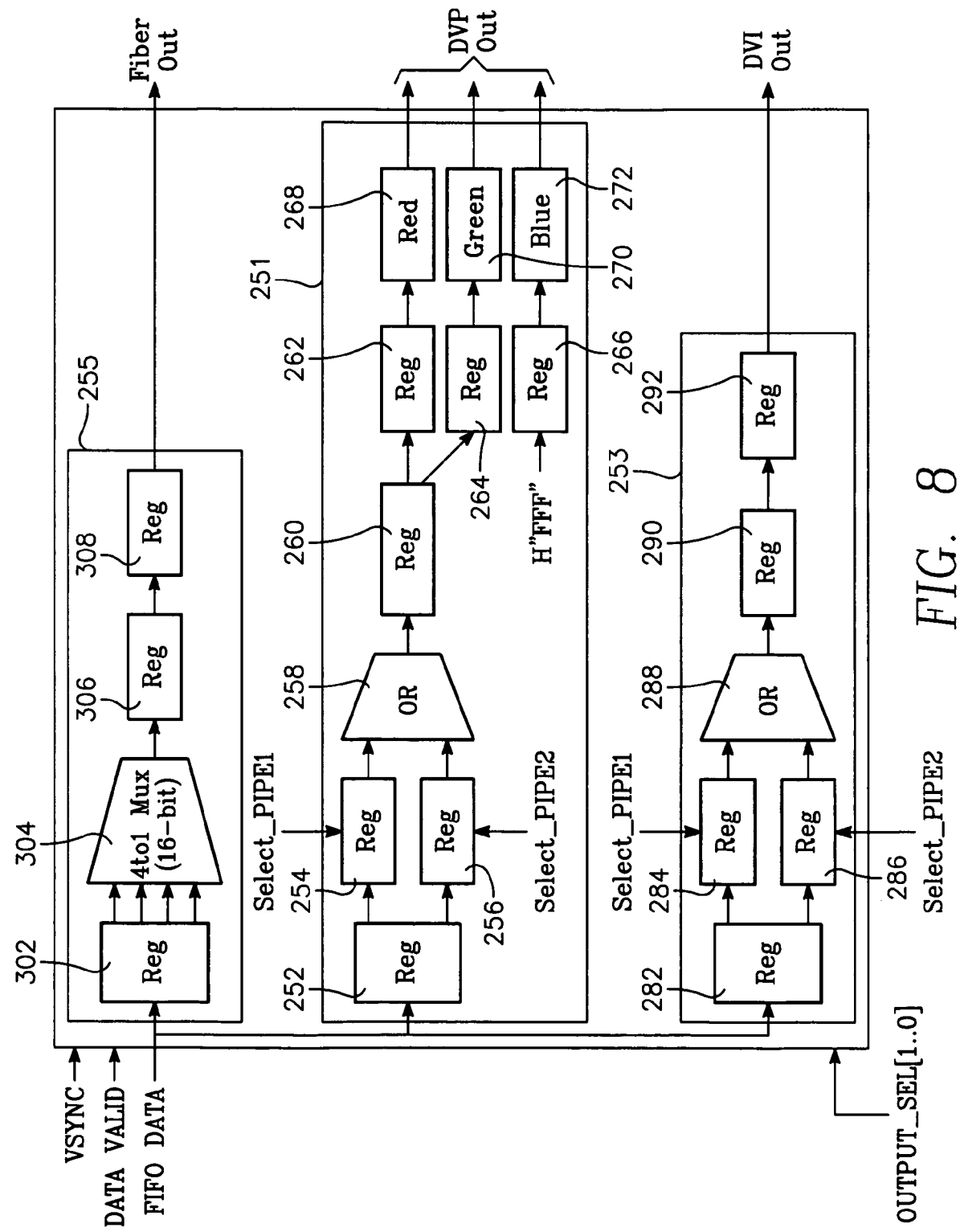
FIG. 8 is a detailed Logic Circuit diagram of the Output Field Programmable Gate Array for the Multiplexer and Crossbar Device of FIG. 3.

As shown in FIG. 8, the Output FPGA 100 demultiplexes the 24-bit DVP formatted input data into 12-bit red and green data and setting the blue to all ones (H"FFF"). The 24-bit DVP formatted data from OR Function gate 258 is supplied to register 260. The 12-bit red data is supplied to register 262 and then to red register 268. The 12-bit green data is supplied to register 264 and then to green register 270. Ones are supplied to register 266 and then to blue register 272. The DVP formatted output data is next sent to psuedo emitter coupled logic (PECL) differential output drivers 280.

The Digital Visual Port (DVI OUTPUT) identified in FIG. 7A, is generated in accordance with the DVI standard output using a preset video image size and frame rate. This output is 8-bit RGB data with vertical sync, horizontal sync, and data valid for receiver timing. The DVI formatted input data is read as a 48-bit from the external FIFO 96, then broken up into two 24-bit pipes.

Register 282 receives the 48-bit DVI formatted output data from buffer 250, splits data into two 24-bit pipes and then supplies one of the 24-bit pipes register 284 and the other 24-bit pipe to register 286. Using the input identified as the Pipe_sel (pipe select) in FIG. 7B, one of the two 24-bit pipes is chosen as the source for the DVI formatted output data which will be sent to a DVI parallel-to-serial encoder and differential driver. This is accomplished utilizing register 284 which receives a Select_PIPE1 signal, register 286 which receives a Select_PIPE2 signal and the OR Function gate 288 of FIG. 7A. The selected 24-bit DVI formatted output stream is sent through registers 290 and register 292 to a buffer 300. A SYNC control 294, frame counter 296 and CBlank counter 298 are also connect to buffer 300. SYNC control 294, frame counter 296 and CBlank counter 298 are utilized by buffer 300 to generate the 8-bit RGB data with vertical sync, horizontal sync, and data valid which is the DVI output stream 104 (FIG. 3).

The FIBER optic port (FIBER OUTPUT) identified in FIG. 7B, is generated utilizing a state machine 310 to read the external FIFO 96. The 48-bit Fiber data stream read from external FIFO 96 passes through register 302 to a 4-to-1 multiplexer 304. Multiplexer 304 multiplex the 48-bit Fiber data stream into four 16-bit parallel data busses/streams, The four 16-bit parallel data streams pass through registers 306 and 308 and buffer 312 sequentially and are then driven into an external ultra-high speed parallel-to-serial encoder 106 (FIG. 4). This encoder feeds serial data into a fiber optic transceiver using OC-48 protocol at a 1.6 gbit/sec serial rate.

The miscellaneous function section for Input Section 128 of FPGA 90 is shown in FIG. 5, and for the Output Sections 257 and 259 of FPGA 100 is shown in FIG. 7B. These include the functions needed to decode the input and output selects along with functions that provide for gen-locking and outputting the data to an external dual port ram for display purposes. The functions included in the Input Section 128 of FPGA 90 (FIG. 5) are Source Select Decode 180, Mode Select Decode 182, Frame Counter 184, Horizontal Counter 186, Vertical Sync Generator 188, Horizontal Sync Generator and Composite Sync Generator 192. There is also a buffer 194 located in the Input Section 128 of FPGA 90. The functions included in the Output Section 257 of FPGA 100 (FIG. 7B) are Destination Select Decode 314 and Pipe Output Select Decode 316. The functions included in the Output Section 259 of FPGA 100 (FIG. 7B) are the OR function 318, Write Control 320 and Dual Port Ram Control 322. A buffer 324 within FPGA 100 provides the synchronous dual port RAM output.

The gen-locking feature residing in the Input FPGA 90, allows the unit to synchronize the input image source (using Composite Sync for the SGI super-computer 36 and Vertical/Horizontal Sync for the Personal Computers 70 and 72) to an external vertical sync input. The external vertical sync input must be well defined in terms of its rate, since absolute known frame size and frame rate is required at the image source circuitry. The gen-locking feature allows the system to be synchronized to the weapon and/or convolving circuits easing the timing problems typically associated with SPIL applications shown in FIGS. 1 and 2.

The display feature resides in the Output FPGA 100 and allows the input image (two colors) to be displayed on an RS170 display. The Output FPGA writes data into external synchronous dual port rams at the frame rate at which they are read from the external FIFO memory buffer 176. External circuits in the design implementation read the dual port ram at the NTSC defined interlaced rate and write this data to digital to analog converters for display. This feature provides a quick-look of the image data and is primarily used during test and debug operations, and is also useful as a sanity check during normal operation.

Figure 11A:
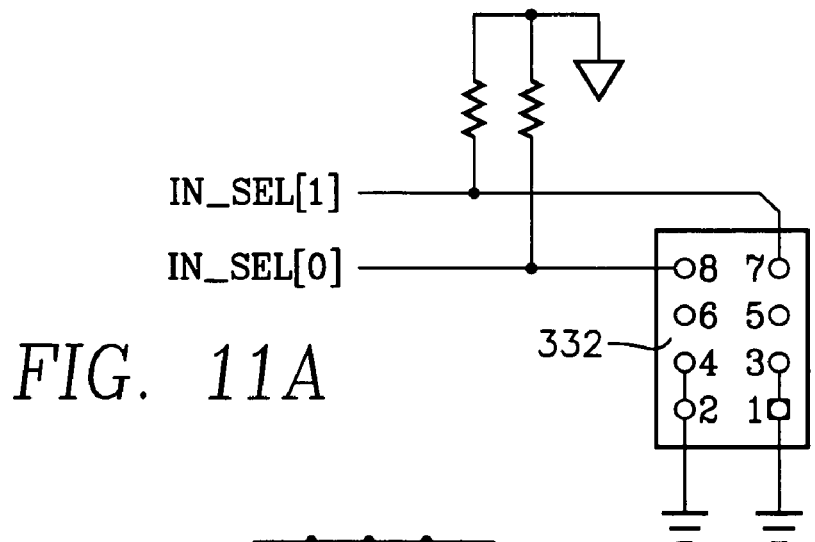
FIGS. 11A-11C illustrates the Color_Sel[3 . . . 0] input signals, the In_Sel[3 . . . 0] input signals and the Out_Sel output signals for the Multiplexer and Crossbar Device of FIG. 3.
Figure 11B:
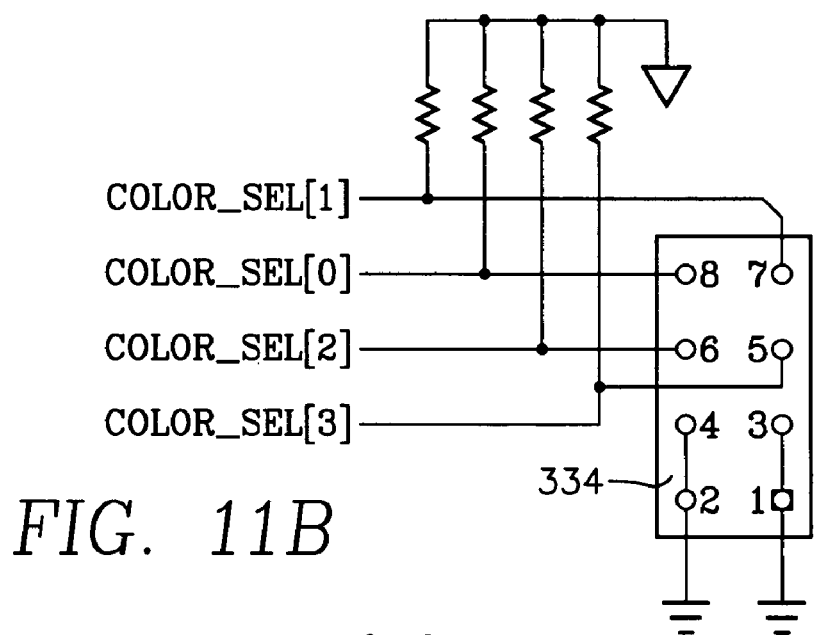
Figure 11C:
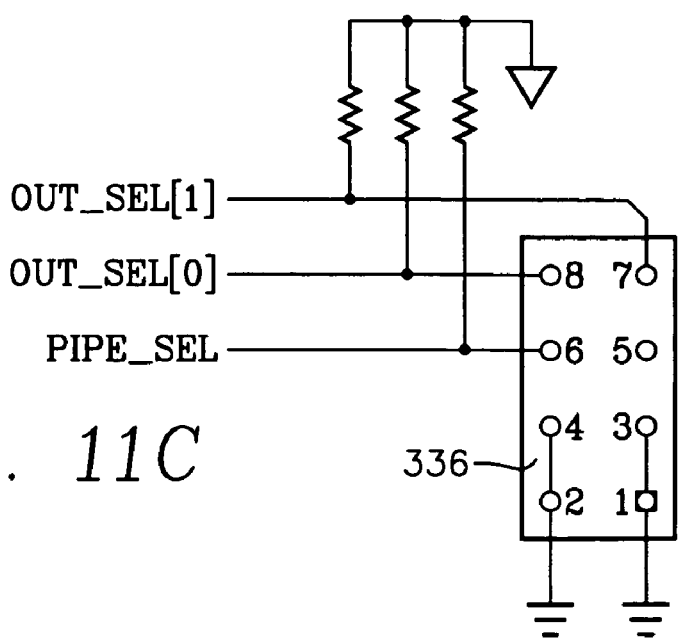

Referring to FIGS. 11A-11C, there are the Color_Sel[3 . . . 0] input signals, the In_Sel[3 . . . 0] input signals and the Out_Sel output signals for the Multiplexer and Crossbar Device 34 of FIG. 3. Jumper Devices 332, 334 and 336 allow the user to preset the Color_Sel[3 . . . 0] input signals, the In_Sel[3 . . . 0] input signals and the Out_Sel output signals.

Figure 12:
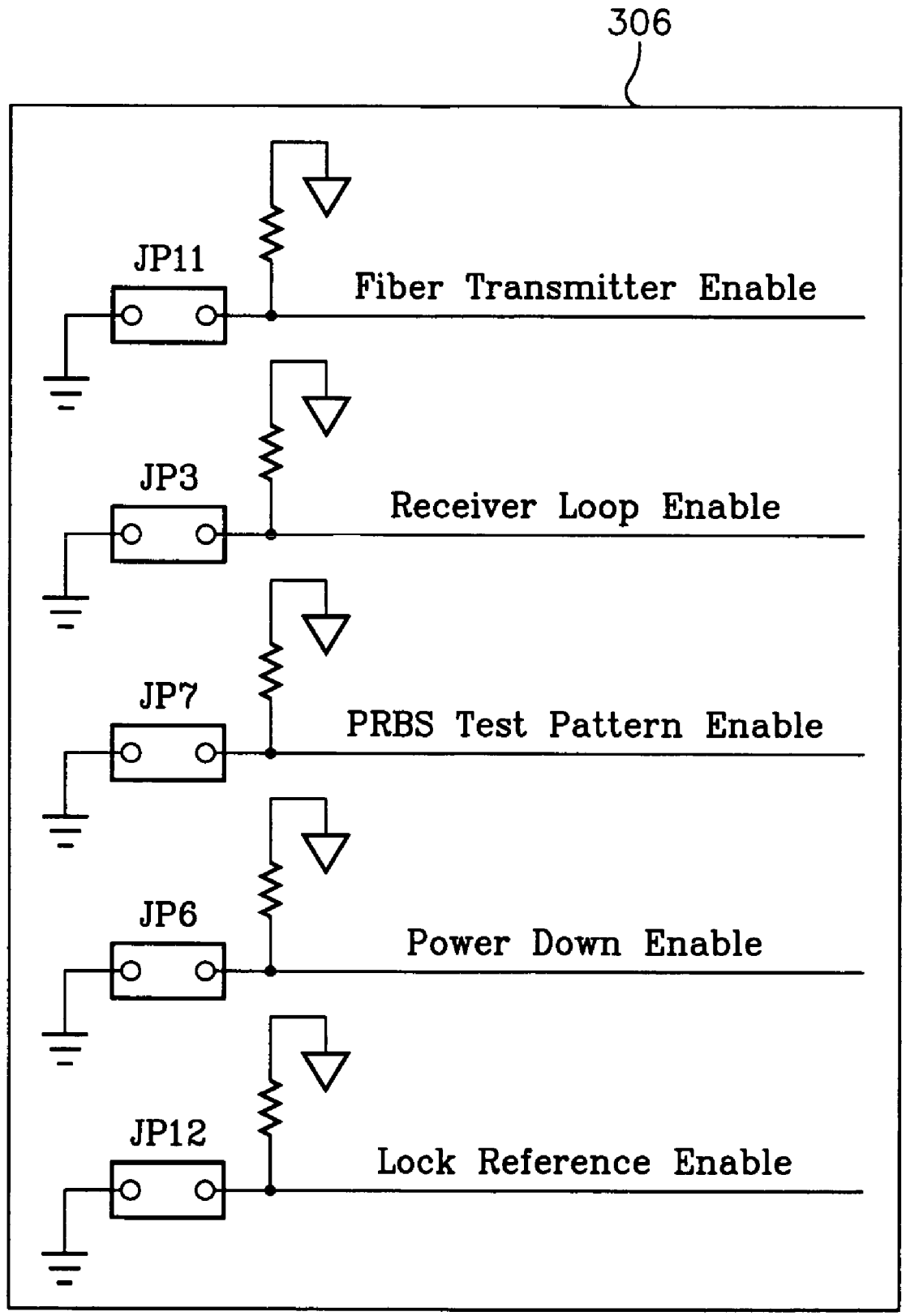
FIG. 12 illustrate switch settings for a variety of enable signals supplied to the Multiplexer and Crossbar Device of FIG. 3.

Referring to FIG. 12, there is shown a jumper board 306 which allows the user to set jumper JP11 activating a Fiber Transmitter Enable signal, jumper JP3 activating a Receiver Loop Enable signal, jumper JP7 activating a PRBS Test Pattern Enable Signal, jumper JP6 activating a Power Down Enable signal, and jumper JP12 activating a Lock Reference Enable signal.

From the foregoing, it is readily apparent that the present invention comprises a new unique and exceedingly useful Digital Multipurpose Multi-Destination Video Multiplexer and Crossbar Device which constitutes a considerable improvement over the known prior art. Many modifications and variations are possible in light of the above teachings. It is therefore to be understood that within the scope of the appended claims that the invention may be practiced otherwise than as specifically described.

What is claimed is:

1. A digital multi-source multi-destination video multiplexer and crossbar device comprising:
(a) an input section for receiving a plurality of video image streams from a plurality of video image generating systems, wherein said video image streams include a pair of DVP (Digital Video Port) formatted video image streams, a pair of DVI (Digital Video Interface) formatted video image streams and a fiber optic video image stream;
(b) first switching means for selecting from said plurality of video image streams at least one video image stream for processing by said input section wherein a user selects said video image streams for processing by said input section from said plurality of video image streams utilizing a digital input select code;
(c) a first FIFO (first-in first-out) memory contained within said input section, said first FIFO memory receiving and storing said pair of DVP formatted video image streams and said pair of DVI formatted video image streams therein;
(d) said first FIFO memory synchronizing said pair of DVP formatted video image streams whenever said pair of DVP formatted video image streams are read out of said first FIFO memory in response to a clock signal provided to said first FIFO memory by a clock oscillator;
(e) said first FIFO memory synchronizing said pair of DVI formatted video image streams whenever said DVI formatted video image streams are read out of said first FIFO memory in response to said clock signal;
(f) a pair of bit alignment and crossbar inserters connected to said first FIFO memory, said pair of bit alignment and crossbar inserters performing alignment and crossbar data control on said pair of DVP formatted video image streams, and said pair of DVI formatted video image streams which includes inserting zeros in unused bits and providing holding registers for red, green and blue components of said pair of DVP formatted video image streams, and said pair of DVI formatted video image streams;
(g) adding means connected to said pair of bit alignment and crossbar inserters for adding the red, green and blue components of said pair of DVP formatted video image streams, and said pair of DVI formatted video image streams to produce video data words for said pair of DVP formatted video image streams, and said pair of DVI formatted video image streams;
(h) a second FIFO memory connected to said input section to receive said video image streams processed by said input section and store therein said video image streams received from said input section;
(i) an output section connected to said second FIFO memory to receive said video image streams processed by said input section and then stored within said second FIFO memory wherein said output section reads said video image streams from said second FIFO memory using the clock signal generated by said clock oscillator;
(j) second switching means for selecting a format for the video image streams which said output section supplies to an external video image processing system wherein said user selects said format utilizing a digital output select code; and
(k) said output section re-formatting said video image streams in accordance with the format selected by said user and then supplying said video image streams to said external video image processing system.

2. The digital multi-source multi-destination video multiplexer and crossbar device of claim 1 wherein said first switching means comprises a first set of dip switches and said second switching means comprises a second set of dip switches.

3. The digital multi-source multi-destination video multiplexer and crossbar device of claim 2 wherein said digital output select code comprises a two bit binary code which said user sets utilizing said second set of dip switches, said user setting said second set of dip switches to 0,1 to provide OC-48 fiber optic video data to said external video image processing system, to 1,0 to provide DVP video data to said external video image processing system and to 1,1 to provide DVI video data to said external video image processing system.

4. The digital multi-source multi-destination video multiplexer and crossbar device of claim 2 wherein said digital input select code comprises a two bit binary code which said user sets utilizing said first set of dip switches, said user setting said first set of dip switches to 0,0 to select said pair of DVP formatted video image streams for processing by said input section, to 0,1 to select said pair of DVI formatted video image streams for processing by said input section, and to 1,0 to select said fiber optic video image stream for processing by said input section.

5. The digital multi-source multi-destination video multiplexer and crossbar device of claim 1 wherein said adding means comprises:
(a) a first RGB adder having a plurality of inputs connected to said holding registers for the red, green and blue components of a first of said pair of DVP formatted video image streams, and an output;
(b) a second RGB adder having a plurality of inputs connected to said holding registers for the red, green and blue components of a second of said pair of DVP formatted video image streams, and an output;
(c) a first twenty four bit combined RGB register having an input connected to the output of said first RGB adder and an output;
(d) a second twenty four bit combined RGB register having an input connected to the output of said second RGB adder and an output;
(e) a first forty eight bit combined RGB register having a first input connected to the output of said first twenty four bit combined RGB register, a second input connected to the output of said second twenty four bit combined RGB register and an output;
(f) a first buffer having an input connected to the output of said first forty eight bit combined RGB register and an output;
(g) a third RGB adder having a plurality of inputs connected to said holding registers for the red, green and blue components of a first of said pair of DVI formatted video image streams, and an output;
(h) a fourth RGB adder having a plurality of inputs connected to said holding registers for the red, green and blue components of a second of said pair of DVI formatted video image streams, and an output;
(i) a third twenty four bit combined RGB register having an input connected to the output of said third RGB adder and an output;
(j) a fourth twenty four bit combined RGB register having an input connected to the output of said fourth RGB adder and an output;
(k) a second forty eight bit combined RGB register having a first input connected to the output of said third twenty four bit combined RGB register, a second input connected to the output of said fourth twenty four bit combined RGB register and an output;
(l) a second buffer having an input connected to the output of said second forty eight bit combined RGB register and an output;
(m) a first OR gate having a first input connected to the output of said first buffer and a second input connected to the output of said second buffer and an output;
(n) a second OR gate having a first input connected to the output of said first buffer and a second input connected to the output of said second buffer and an output; and
(o) a third buffer having a first input connected to the output of said first OR gate, a second input connected to the output of said second OR gate and an output connected to said second FIFO memory.

6. The digital multi-source multi-destination video multiplexer and crossbar device of claim 5 further comprising a test port having a testbar generator for generating a bar graph used for testing and verification of an operational capability of said digital multi-source multi-destination video multiplexer and crossbar device, said testbar generator having an output connected to a third input of said second OR gate.

7. The digital multi-source multi-destination video multiplexer and crossbar device of claim 1 wherein said output section includes:
(a) a state machine for reading a forty eight bit fiber optic data stream read from said second FIFO memory when said digital multi-source multi-destination video multiplexer and crossbar device is processing said fiber optic video image stream;
(b) a four-to-one multiplexer connected to said second FIFO memory to receive said forty eight bit fiber optic data stream read from said second FIFO memory, said four to one multiplexer multiplexing said forty eight bit fiber optic data stream into four sixteen bit parallel data streams;
(c) a plurality of storage registers connected to said four to one multiplexer to receive said four sixteen bit parallel data streams from said four to one multiplexer;
(c) a buffer connected to said storage registers; and
(d) said state machine controlling an operation of said four to one multiplexer and said storage register wherein said four sixteen bit parallel data streams pass through holding registers and said buffer sequentially and are then driven into an external parallel-to-serial encoder.

8. The digital multi-source multi-destination video multiplexer and crossbar device of claim 1 wherein said input section includes a gen-locking capability which allows said input section to synchronize said video image generating systems to an external vertical sync signal input.

9. The digital multi-source multi-destination video multiplexer and crossbar device of claim 8 wherein said gen-locking capability allows said input section to synchronize said digital multi-source multi-destination video multiplexer and crossbar device to an external weapon and external convolving circuits.

10. The digital multi-source multi-destination video multiplexer and crossbar device of claim 1 wherein a mode of operation for said pair of bit alignment and crossbar inserters is determined by a four bit digital code supplied to a color select input for each of said pair of bit alignment and crossbar inserters.

11. The digital multi-source multi-destination video multiplexer and crossbar device of claim 10 wherein a first of said pair of bit alignment and crossbar inserters processes said DVP formatted video image streams when said four bit digital code is binary 0000, 0001, 0010, 0100, 0101, 0110, 0111, 1000 or 1001, and a second of said pair of bit alignment and crossbar inserters processes said DVI formatted video image streams when said four bit digital code is 1010, 1011, 1100, 1101 or 1110.

12. A digital multi-source multi-destination video multiplexer and crossbar device comprising:
(a) a first programmable gate array for receiving a plurality of video image streams from a plurality of video image generating systems, wherein said video image streams include a pair of DVP (Digital Video Port) formatted video image streams, a pair of DVI (Digital Video Interface) formatted video image streams and a fiber optic video image stream;

(b) a first set of dip switches for selecting from said plurality of video image streams at least one video image stream for processing by said first programmable gate array wherein a user selects said video image streams for processing by said first programmable gate array from said plurality of video image streams utilizing a digital input select code which said user enters into said first programmable gate array utilizing said first set of dip switches;

(c) a first FIFO (first-in first-out) memory contained within said first programmable gate array, said first FIFO memory receiving and storing said pair of DVP formatted video image streams and said pair of DVI formatted video image streams therein;

(d) said first FIFO memory synchronizing said pair of DVP formatted video image streams whenever said pair of DVP formatted video image streams are read out of said first FIFO memory in response to a clock signal provided to said first FIFO memory by a clock oscillator;

(e) said first FIFO memory synchronizing said pair of DVI formatted video image streams whenever said DVI formatted video image streams are read out of said first FIFO memory in response to said clock signal;

(f) a pair of twenty four bit alignment and crossbar inserters connected to said first FIFO memory, said pair of twenty four bit alignment and crossbar inserters performing twenty four bit alignment and crossbar data control on said pair of DVP formatted video image streams, and said pair of DVI formatted video image streams which includes inserting zeros in unused bits and providing twenty four bit holding registers for red, green and blue components of said pair of DVP formatted video image streams, and said pair of DVI formatted video image streams;

(g) a plurality of digital adders connected to the holding registers for said pair of twenty four bit alignment and crossbar inserters, said plurality of digital adders adding the red, green and blue components of said pair of DVP formatted video image streams, and said pair of DVI formatted video image streams to produce forty eight bit video data words for said pair of DVP formatted video image streams, and said pair of DVI formatted video image streams;

(h) a second FIFO memory connected to said first programmable gate array to receive said video image streams processed by said first programmable gate array and store therein said video image streams received from said first programmable gate array;

(i) a second programmable gate array connected to said second FIFO memory to receive said video image streams processed by said first programmable gate array and then stored within said second FIFO memory wherein said second programmable gate array reads said video image streams from said second FIFO memory using the clock signal generated by said clock oscillator;

(j) a second set of dip switches for selecting a format for the video image streams which said second programmable gate array supplies to an external video image processing system wherein said user selects said format utilizing a digital output select code which said user enters into said second programmable gate array utilizing said second set of dip switches; and (k) said second programmable gate array re-formatting said video image streams in accordance with the format selected by said user and then supplying said video image streams to said external video image processing system.

13. The digital multi-source multi-destination video multiplexer and crossbar device of claim 12 wherein said adding means comprises:

(a) a first RGB adder having a plurality of inputs connected to said twenty four bit holding registers for the red, green and blue components of a first of said pair of DVP formatted video image streams, and an output;

(b) a second RGB adder having a plurality of inputs connected to said twenty four bit holding registers for the red, green and blue components of a second of said pair of DVP formatted video image streams, and an output;

(c) a first twenty four bit combined RGB register having an input connected to the output of said first RGB adder and an output;

(d) a second twenty four bit combined RGB register having an input connected to the output of said second RGB adder and an output;

(e) a first forty eight bit combined RGB register having a first input connected to the output of said first twenty four bit combined RGB register, a second input connected to the output of said second twenty four bit combined RGB register and an output;

(f) a first buffer having an input connected to the output of said first forty eight bit combined RGB register and an output;

(g) a third RGB adder having a plurality of inputs connected to said twenty four bit holding registers for the red, green and blue components of a first of said pair of DVI formatted video image streams, and an output;

(h) a fourth RGB adder having a plurality of inputs connected to said twenty four bit holding registers for the red, green and blue components of a second of said pair of DVI formatted video image streams, and an output;

(i) a third twenty four bit combined RGB register having an input connected to the output of said third RGB adder and an output;

(j) a fourth twenty four bit combined RGB register having an input connected to the output of said fourth RGB adder and an output;

(k) a second forty eight bit combined RGB register having a first input connected to the output of said third twenty four bit combined RGB register, a second input connected to the output of said fourth twenty four bit combined RGB register and an output;

(l) a second buffer having an input connected to the output of said second forty eight bit combined RGB register and an output;

(m) a first OR gate having a first input connected to the output of said first buffer and a second input connected to the output of said second buffer and an output;

(n) a second OR gate having a first input connected to the output of said first buffer and a second input connected to the output of said second buffer and an output; and (o) a third buffer having a first input connected to the output of said first OR gate, a second input connected to the output of said second OR gate and an output connected to said second FIFO memory.

14. The digital multi-source multi-destination video multiplexer and crossbar device of claim 13 further comprising a test port having a testbar generator for generating a bar graph used for testing and verification of an operational capability of said digital multi-source multi-destination video multiplexer and crossbar device, said testbar generator having an output connected to a third input of said second OR gate.

15. The digital multi-source multi-destination video multiplexer and crossbar device of claim 12 wherein a mode of operation for said pair of twenty four bit alignment and crossbar inserters is determined by a four bit digital code supplied to a color select input for each of said pair of twenty four bit alignment and crossbar inserters, a first of said pair of twenty four bit alignment and crossbar inserters processes said DVP formatted video image streams when said four bit digital code is binary 0000, 0001, 0010, 0100, 0101, 0110, 0111, 1000 or 1001, and a second of said pair of twenty four bit alignment and crossbar inserters processes said DVI formatted video image streams when said four bit digital code is 1010, 1011, 1100, 1101 or 1110.

16. The digital multi-source multi-destination video multiplexer and crossbar device of claim 12 wherein said digital output select code comprises a two bit binary code which said user sets utilizing said second set of dip switches, said user setting said second set of dip switches to 0,1 to provide OC-48 fiber optic video data to said external video image processing system, to 1,0 to provide DVP video data to said external video image processing system and to 1,1 to provide DVI video data to said external video image processing system.

17. The digital multi-source multi-destination video multiplexer and crossbar device of claim 12 wherein said digital input select code comprises a two bit binary code which said user sets utilizing said first set of dip switches, said user setting said first set of dip switches to 0,0 to select said pair of DVP formatted video image streams for processing by said input section, to 0,1 to select said pair of DVI formatted video image streams for processing by said input section, and to 1,0 to select said fiber optic video image stream for processing by said input section.

18. The digital multi-source multi-destination video multiplexer and crossbar device of claim 12 wherein said second programmable gate array includes:
  (a) a state machine for reading a forty eight bit fiber optic data stream read from said second FIFO memory when said digital multi-source multi-destination video multiplexer and crossbar device is processing said fiber optic video image stream:
  (b) a four-to-one multiplexer connected to said second FIFO memory to receive said forty eight bit fiber optic data stream read from said second FIFO memory, said four to one multiplexer multiplexing said forty eight bit fiber optic data stream into four sixteen bit parallel data streams;
  (c) a plurality of storage registers connected to said four to one multiplexer to receive said four sixteen bit parallel data streams from said four to one multiplexer;
  (c) a buffer connected to said storage registers; and
  (d) said state machine controlling an operation of said four to one multiplexer and said storage register wherein said four sixteen bit parallel data streams pass through holding registers and said buffer sequentially and are then driven into an external parallel-to-serial encoder.

* * * * *